(12) United States Patent
Boronkay et al.

(10) Patent No.: US 12,251,288 B2
(45) Date of Patent: Mar. 18, 2025

(54) VARIABLE DIRECTION TOOTH ATTACHMENTS

(71) Applicant: Align Technology, Inc., San Jose, CA (US)

(72) Inventors: Allen Boronkay, San Jose, CA (US); Tzishing Jesse Lim, Mountain View, CA (US)

(73) Assignee: ALIGN TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/685,296

(22) Filed: Mar. 2, 2022

(65) Prior Publication Data

US 2022/0401185 A1 Dec. 22, 2022

Related U.S. Application Data

(60) Continuation of application No. 16/031,822, filed on Jul. 10, 2018, now Pat. No. 11,298,211, which is a division of application No. 15/046,193, filed on Feb. 17, 2016, now Pat. No. 10,045,835.

(51) Int. Cl.
| | |
|---|---|
| *G06F 30/20* | (2020.01) |
| *A61C 7/00* | (2006.01) |
| *A61C 7/08* | (2006.01) |
| *A61C 7/14* | (2006.01) |

(52) U.S. Cl.
CPC .............. *A61C 7/08* (2013.01); *A61C 7/002* (2013.01); *A61C 7/14* (2013.01)

(58) Field of Classification Search
CPC .............. A61C 7/08; A61C 7/002; A61C 7/14

USPC .............................................. 433/6; 703/1, 2
See application file for complete search history.

(56) References Cited

U.S. PATENT DOCUMENTS

| | | |
|---|---|---|
| 6,386,864 B1 | 5/2002 | Kuo |
| 6,450,807 B1 | 9/2002 | Chishti et al. |
| 6,454,565 B2 | 9/2002 | Phan et al. |
| 6,471,511 B1 | 10/2002 | Chishti et al. |
| 6,607,382 B1 | 8/2003 | Kuo et al. |
| 6,783,604 B2 | 8/2004 | Tricca |
| 6,790,035 B2 | 9/2004 | Tricca et al. |
| 6,814,574 B2 | 11/2004 | Abolfathi et al. |
| 6,947,038 B1 | 9/2005 | Anh et al. |
| 7,074,039 B2 | 7/2006 | Kopelman et al. |
| 7,104,792 B2 | 9/2006 | Taub et al. |
| 7,121,825 B2 | 10/2006 | Chishti et al. |
| 7,160,107 B2 | 1/2007 | Kopelman et al. |
| 7,192,273 B2 | 3/2007 | McSurdy, Jr. |
| 7,347,688 B2 | 3/2008 | Kopelman et al. |
| 7,354,270 B2 | 4/2008 | Abolfathi et al. |
| 7,448,514 B2 | 11/2008 | Wen |

(Continued)

*Primary Examiner* — Andre Pierre Louis
(74) *Attorney, Agent, or Firm* — Wilson Sonsini Goodrich & Rosati

(57) ABSTRACT

Tooth attachments are provided comprising one or more convex surfaces for engagement by a surface of an orthodontic appliance. Polymeric shell appliances are provided in which the polymeric shell appliances are configured to provide one or more activation forces to facilitate tooth movement. The polymeric shell appliances may comprise one or more tooth receiving cavities. The polymeric shell appliances may further comprise an engagement portion with a surface configured to engage a convex attachment surface in order to apply a tooth moving force.

18 Claims, 18 Drawing Sheets

(56) References Cited

U.S. PATENT DOCUMENTS

| | | |
|---|---|---|
| 7,481,121 B1 | 1/2009 | Cao |
| 7,543,511 B2 | 6/2009 | Kimura et al. |
| 7,553,157 B2 | 6/2009 | Abolfathi et al. |
| 7,766,658 B2 | 8/2010 | Tricca et al. |
| 7,854,609 B2 | 12/2010 | Chen et al. |
| 7,871,269 B2 | 1/2011 | Wu et al. |
| 7,878,801 B2 | 2/2011 | Abolfathi et al. |
| 7,878,805 B2 | 2/2011 | Moss et al. |
| 7,883,334 B2 | 2/2011 | Li et al. |
| 7,914,283 B2 | 3/2011 | Kuo |
| 7,947,508 B2 | 5/2011 | Tricca et al. |
| 8,152,518 B2 | 4/2012 | Kuo |
| 8,172,569 B2 | 5/2012 | Matty et al. |
| 8,235,715 B2 | 8/2012 | Kuo |
| 8,292,617 B2 | 10/2012 | Brandt et al. |
| 8,337,199 B2 | 12/2012 | Wen |
| 8,517,726 B2 | 8/2013 | Kakavand et al. |
| 8,641,414 B2 | 2/2014 | Borovinskih et al. |
| 8,684,729 B2 | 4/2014 | Wen |
| 8,758,009 B2 | 6/2014 | Chen et al. |
| 8,771,149 B2 | 7/2014 | Rahman et al. |
| 8,899,976 B2 | 12/2014 | Chen et al. |
| 8,899,977 B2 | 12/2014 | Cao et al. |
| 8,936,463 B2 | 1/2015 | Mason et al. |
| 8,936,464 B2 | 1/2015 | Kopelman |
| 9,022,781 B2 | 5/2015 | Kuo et al. |
| 9,119,691 B2 | 9/2015 | Namiranian et al. |
| 9,161,823 B2 | 10/2015 | Morton et al. |
| 9,241,774 B2 | 1/2016 | Li et al. |
| 9,326,831 B2 | 5/2016 | Cheang |
| 9,433,476 B2 | 9/2016 | Khardekar et al. |
| 9,610,141 B2 | 4/2017 | Kopelman et al. |
| 9,655,691 B2 | 5/2017 | Li et al. |
| 9,675,427 B2 | 6/2017 | Kopelman |
| 9,700,385 B2 | 7/2017 | Webber |
| 9,744,001 B2 | 8/2017 | Choi et al. |
| 9,844,424 B2 | 12/2017 | Wu et al. |
| 10,045,835 B2 | 8/2018 | Boronkay et al. |
| 10,111,730 B2 | 10/2018 | Webber et al. |
| 10,150,244 B2 | 12/2018 | Sato et al. |
| 10,201,409 B2 | 2/2019 | Mason et al. |
| 10,213,277 B2 | 2/2019 | Webber et al. |
| 10,299,894 B2 | 5/2019 | Tanugula et al. |
| 10,363,116 B2 | 7/2019 | Boronkay |
| 10,383,705 B2 | 8/2019 | Shanjani et al. |
| D865,180 S | 10/2019 | Bauer et al. |
| 10,449,016 B2 | 10/2019 | Kimura et al. |
| 10,463,452 B2 | 11/2019 | Matov et al. |
| 10,470,847 B2 | 11/2019 | Shanjani et al. |
| 10,492,888 B2 | 12/2019 | Chen et al. |
| 10,517,701 B2 | 12/2019 | Boronkay |
| 10,537,406 B2 | 1/2020 | Wu et al. |
| 10,537,463 B2 | 1/2020 | Kopelman |
| 10,548,700 B2 | 2/2020 | Fernie |
| 10,555,792 B2 | 2/2020 | Kopelman et al. |
| 10,588,776 B2 | 3/2020 | Cam et al. |
| 10,613,515 B2 | 4/2020 | Cramer et al. |
| 10,639,134 B2 | 5/2020 | Shanjani et al. |
| 10,743,964 B2 | 8/2020 | Wu et al. |
| 10,758,323 B2 | 9/2020 | Kopelman |
| 10,781,274 B2 | 9/2020 | Liska et al. |
| 10,813,720 B2 | 10/2020 | Grove et al. |
| 10,874,483 B2 | 12/2020 | Boronkay |
| 10,881,487 B2 | 1/2021 | Cam et al. |
| 10,912,629 B2 | 2/2021 | Tanugula et al. |
| 10,959,810 B2 | 3/2021 | Li et al. |
| 10,993,783 B2 | 5/2021 | Wu et al. |
| 11,026,768 B2 | 6/2021 | Moss et al. |
| 11,026,831 B2 | 6/2021 | Kuo |
| 11,045,282 B2 | 6/2021 | Kopelman et al. |
| 11,045,283 B2 | 6/2021 | Riley et al. |
| 11,103,330 B2 | 8/2021 | Webber et al. |
| 11,123,156 B2 | 9/2021 | Cam et al. |
| 11,154,382 B2 | 10/2021 | Kopelman et al. |
| 11,166,788 B2 | 11/2021 | Webber |
| 11,174,338 B2 | 11/2021 | Liska et al. |
| 11,219,506 B2 | 1/2022 | Shanjani et al. |
| 11,259,896 B2 | 3/2022 | Matov et al. |
| 11,273,011 B2 | 3/2022 | Shanjani et al. |
| 11,278,375 B2 | 3/2022 | Wang et al. |
| 11,318,667 B2 | 5/2022 | Mojdeh et al. |
| 11,331,166 B2 | 5/2022 | Morton et al. |
| 11,344,385 B2 | 5/2022 | Morton et al. |
| 2002/0192617 A1 | 12/2002 | Phan et al. |
| 2003/0198911 A1* | 10/2003 | Knopp .................. B33Y 10/00 433/24 |
| 2004/0166462 A1 | 8/2004 | Phan et al. |
| 2004/0166463 A1 | 8/2004 | Wen et al. |
| 2005/0014105 A1 | 1/2005 | Abolfathi et al. |
| 2005/0186524 A1 | 8/2005 | Abolfathi et al. |
| 2005/0244768 A1 | 11/2005 | Taub et al. |
| 2006/0019218 A1 | 1/2006 | Kuo |
| 2006/0078841 A1 | 4/2006 | Desimone et al. |
| 2006/0115782 A1 | 6/2006 | Li et al. |
| 2006/0115785 A1 | 6/2006 | Li et al. |
| 2006/0199142 A1 | 9/2006 | Liu et al. |
| 2006/0234179 A1 | 10/2006 | Wen et al. |
| 2008/0118882 A1 | 5/2008 | Su |
| 2008/0160473 A1 | 7/2008 | Li et al. |
| 2008/0286716 A1 | 11/2008 | Sherwood |
| 2008/0286717 A1 | 11/2008 | Sherwood |
| 2009/0191502 A1* | 7/2009 | Cao ........................ A61C 7/002 433/24 |
| 2009/0280450 A1 | 11/2009 | Kuo |
| 2010/0055635 A1 | 3/2010 | Kakavand |
| 2010/0129763 A1 | 5/2010 | Kuo |
| 2014/0067334 A1 | 3/2014 | Kuo |
| 2015/0079355 A1* | 3/2015 | Woldegergis ........ A61C 8/0053 264/16 |
| 2015/0297322 A1* | 10/2015 | Fischler .............. A61C 13/2656 433/177 |
| 2016/0193014 A1 | 7/2016 | Morton et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007366 A1 | 1/2017 | Kopelman et al. |
| 2017/0007386 A1 | 1/2017 | Mason et al. |
| 2017/0135792 A1 | 5/2017 | Webber |
| 2017/0135793 A1 | 5/2017 | Webber et al. |
| 2017/0165032 A1 | 6/2017 | Webber et al. |
| 2018/0360567 A1 | 12/2018 | Xue et al. |
| 2018/0368944 A1 | 12/2018 | Sato et al. |
| 2019/0000592 A1 | 1/2019 | Cam et al. |
| 2019/0000593 A1 | 1/2019 | Cam et al. |
| 2019/0021817 A1 | 1/2019 | Sato et al. |
| 2019/0046297 A1 | 2/2019 | Kopelman et al. |
| 2019/0099129 A1 | 4/2019 | Kopelman et al. |
| 2019/0125494 A1 | 5/2019 | Li et al. |
| 2019/0125497 A1 | 5/2019 | Derakhshan et al. |
| 2019/0152152 A1 | 5/2019 | O'Leary et al. |
| 2019/0175304 A1 | 6/2019 | Morton et al. |
| 2019/0262101 A1 | 8/2019 | Shanjani et al. |
| 2019/0269482 A1* | 9/2019 | Shanjani ................ A61B 90/37 |
| 2019/0298494 A1 | 10/2019 | Webber et al. |
| 2019/0314119 A1 | 10/2019 | Kopelman et al. |
| 2019/0343606 A1 | 11/2019 | Wu et al. |
| 2020/0000553 A1 | 1/2020 | Makarenkova et al. |
| 2020/0100864 A1 | 4/2020 | Wang et al. |
| 2020/0100865 A1 | 4/2020 | Wang et al. |
| 2020/0100866 A1 | 4/2020 | Medvinskaya et al. |
| 2020/0155276 A1 | 5/2020 | Cam et al. |
| 2020/0188062 A1 | 6/2020 | Kopelman et al. |
| 2020/0214598 A1 | 7/2020 | Li et al. |
| 2020/0214801 A1 | 7/2020 | Wang et al. |
| 2020/0390523 A1 | 12/2020 | Sato et al. |
| 2021/0078357 A1 | 3/2021 | Venkatasanthanam et al. |
| 2021/0147672 A1 | 5/2021 | Cole et al. |

* cited by examiner

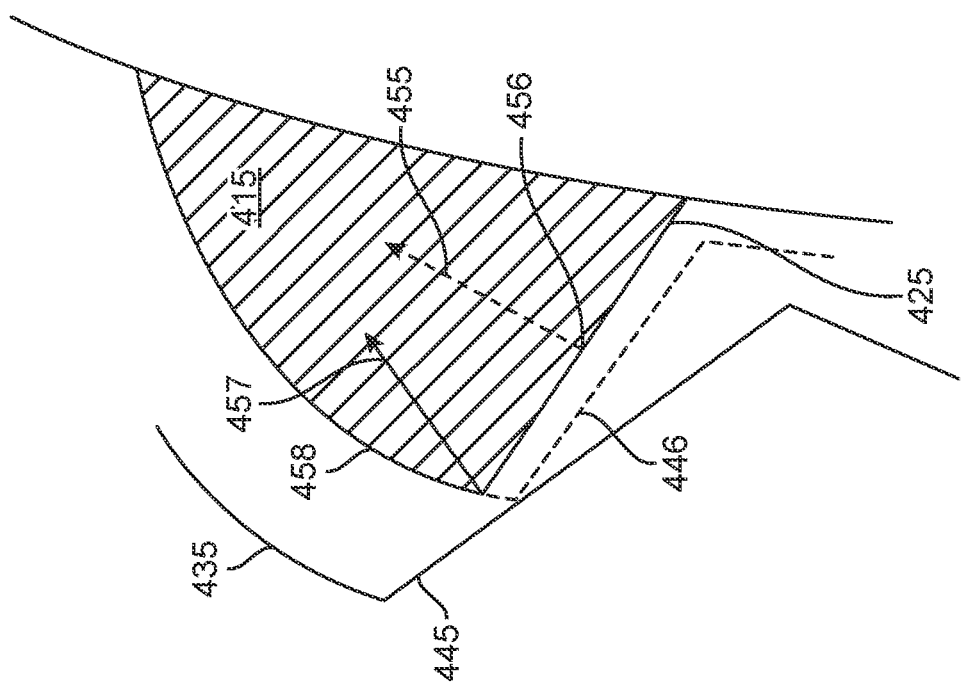
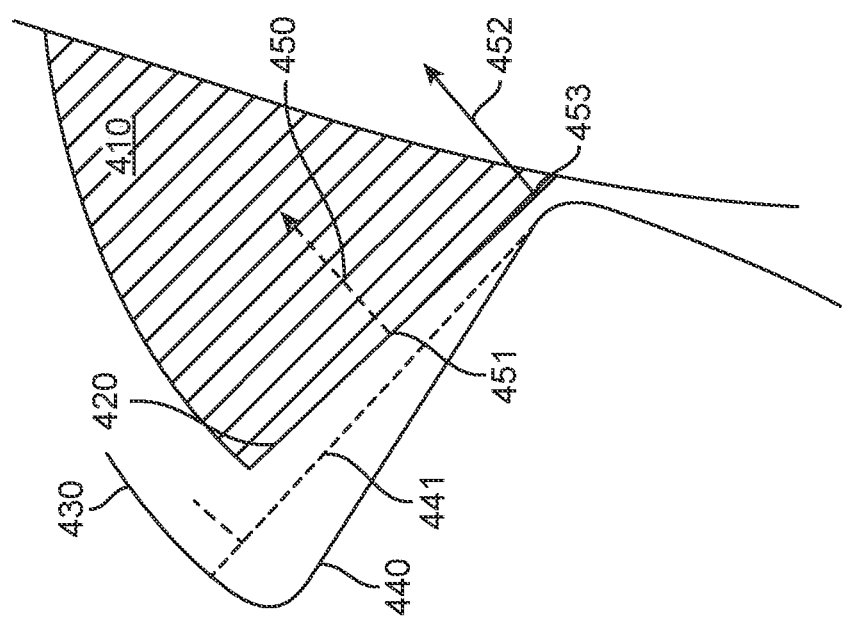
FIG. 4B
FIG. 4A

VARIABLE DIRECTION TOOTH ATTACHMENTS

CROSS-REFERENCE

This application is a continuation of U.S. application Ser. No. 16/031,822, filed Jul. 10, 2018, now U.S. Pat. No. 11,298,211, issued Apr. 12, 2022, which is a divisional application of U.S. application Ser. No. 15/046,193, filed Feb. 17, 2016, now U.S. Pat. No. 10,045,835, issued Aug. 14, 2018, all of which are incorporated herein by reference in their entirety and to which applications we claim priority under 35 USC § 120.

BACKGROUND

Prior methods and apparatus for moving teeth can be less than ideal in at least some respects. Although orthodontic shell appliances can be effective in moving teeth, complex tooth movements may be benefit from the use of attachments on the teeth that engage the appliance to move the tooth. Although attachments can be effective, complex tooth movements may require multiple attachments on the teeth, which can be somewhat cumbersome and unsightly for the patient, as well as difficult for the orthodontic practitioner to apply. Furthermore, prior attachments can be sensitive to manufacturing variations resulting in unpredictable or inconsistent forces applied to teeth. It would be helpful to provide more versatile and reliable attachments, allowing the orthodontic shell appliances to move teeth more precisely and with less need to replace attachments during treatment.

SUMMARY

Embodiments of the present disclosure provide improved systems, methods, and apparatus for moving teeth. In many embodiments, the orthodontic systems herein include an attachment device having a convex surface. The convex surface can engage with an appliance shell to apply repositioning forces to teeth with improved reliability and reduced sensitivity to variations in manufacturing tolerances. The convex surface of the attachment further allows the application of a plurality of tooth moving forces by contacting the attachment surface at different locations with engagement surfaces of one or more appliances, sequentially and/or concurrently. In many embodiments, the direction of the tooth moving forces applied may be independently and continuously varied by continuously varying the contact location of an engagement portion of an appliance with the convex surface of the attachment. The tooth moving forces applicable by attachments as disclosed herein can be used to move teeth along any of a wide array of trajectories.

In one aspect, an orthodontic system for repositioning a patient's teeth is provided. The system comprises an attachment device configured to be coupled to a tooth of the patient and comprising a convex surface. The system also comprises a plurality of appliance shells each shaped to receive the patient's teeth, each appliance comprising an engagement portion positioned to engage the convex surface of the attachment device so as to apply a repositioning force to the tooth. The engagement portions of at least some of the plurality of appliance shells may each be arranged to contact the convex surface at a different respective location so as to apply different respective repositioning forces to the tooth.

In another aspect, a computer-implemented method for processing tooth movement data in order to design an orthodontic system for repositioning a patient's teeth is provided. The computer system receives tooth movement data indicative of a movement trajectory for a tooth of the patient, and processes data including the tooth movement data so as to determine a geometry for an attachment device to be coupled to the tooth, the attachment device comprising a convex surface. The computer system further processes data including the tooth movement data so as to determine geometries for a plurality of appliance shells, each shaped to receive the patient's teeth. The plurality of appliance shells for which the geometries are determined each comprise an engagement portion positioned to engage the convex surface of the attachment device so as to apply a repositioning force to the tooth. Optionally, the engagement portions of at least some of the plurality of appliance shells are each arranged to contact the convex surface at a different respective location so as to apply different respective repositioning forces to the tooth in order to move the tooth along the movement trajectory.

In another aspect, an orthodontic appliance for repositioning a patient's teeth is provided. The appliance comprises an attachment device configured to be coupled to a tooth of the patient and comprising a convex surface, as well as a shell comprising a plurality of cavities shaped to receive the patient's teeth. At least one cavity of the plurality of cavities comprises a receptacle shaped to receive the attachment device, and the receptacle comprises a planar surface positioned to engage the convex surface of the attachment device so as to apply a repositioning force to the tooth.

Other objects and features of the present invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the invention are utilized, and the accompanying drawings of which:

FIGS. 4A and 4B illustrate how small errors in appliance fabrication can lead to large changes in the location of interaction between a planar appliance surface and a planar attachment surface, in accordance with many embodiments;

DETAILED DESCRIPTION

Figure 1A:
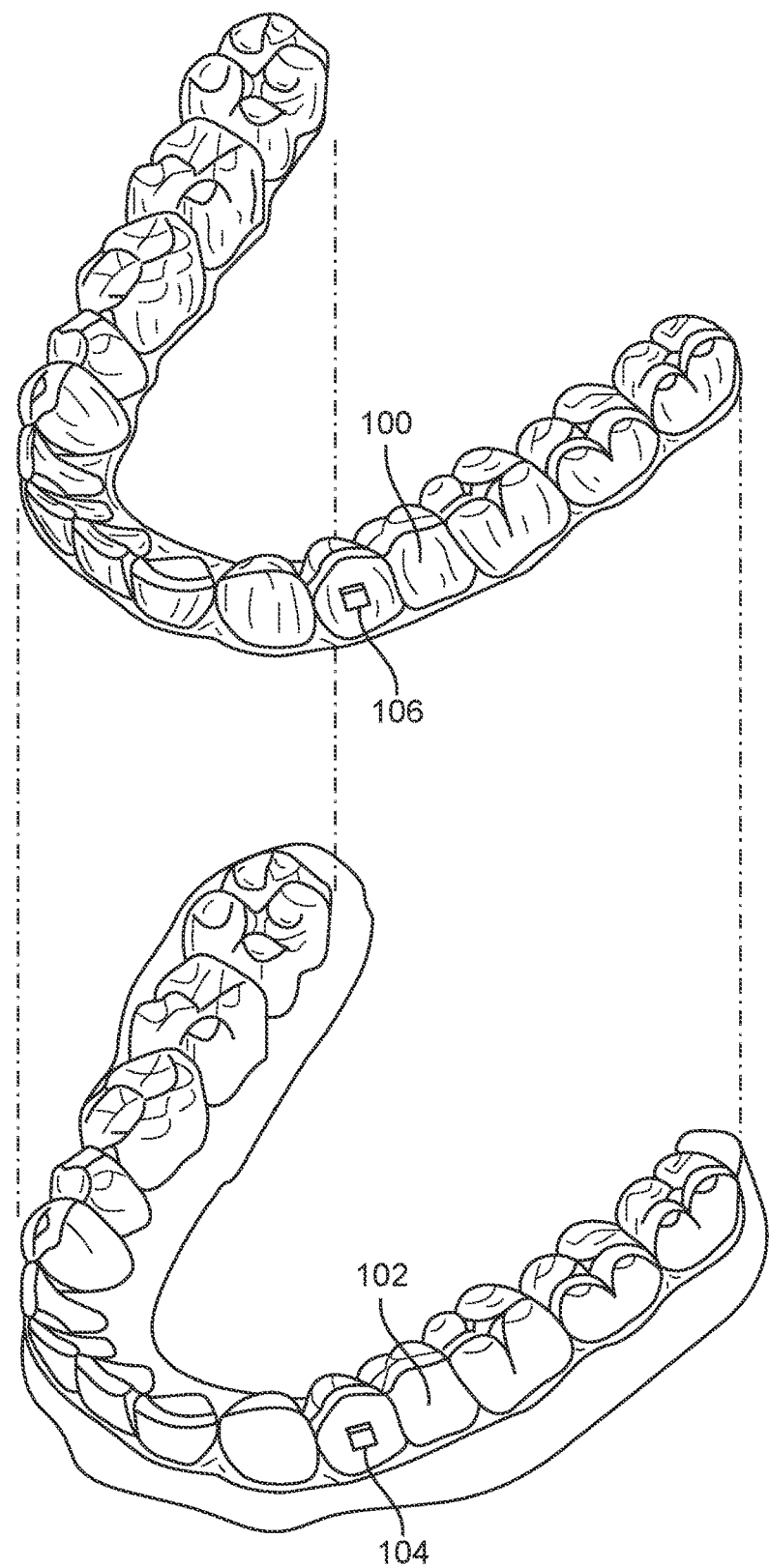
FIG. 1A illustrates a tooth repositioning appliance, in accordance with many embodiments.

The present disclosure provides improved systems, methods, and apparatus for moving a patient's teeth. In many embodiments, the orthodontic systems herein include an attachment device having a convex surface. The attachment device is attached to a tooth of a patient. The convex surface can engage with an appliance shell to apply repositioning forces to teeth with improved reliability and reduced sensitivity to variations in manufacturing tolerances. Additionally, the convex surface of the attachment further allows the application of a plurality of tooth moving forces by contacting the attachment surface at different locations with engagement surfaces of one or more appliances, sequentially and/or concurrently. In many embodiments, the direction of the tooth moving forces applied may be independently and continuously varied by continuously varying the contact location of an engagement portion of an appliance with the convex surface of the attachment. This can be advantageous, since it is often less expensive and difficult to replace or adjust a removable orthodontic appliance than to replace or adjust an attachment. Applying tooth moving forces using attachments as disclosed herein permits the movement of teeth along various trajectories, including complex trajectories, with greater reliability while allowing changes in direction without needing to replace the attachment.

As used herein the term "and/or" is used as a functional word to indicate that two words or expressions are to be taken together or individually. For example, A and/or B encompasses A alone, B alone, and A and B together.

In one aspect, an orthodontic system for repositioning a patient's teeth is provided. The system comprises an attachment device configured to be coupled to a tooth of the patient and comprising a convex surface. The system also comprises a plurality of appliance shells each shaped to receive the patient's teeth, each appliance shell comprising an engagement portion positioned to engage the convex surface of the attachment device so as to apply a repositioning force to the tooth. In many embodiments, the engagement portions of at least some of the plurality of appliance shells are each arranged to contact the convex surface at a different respective location so as to apply different respective repositioning forces to the tooth. Optionally, the engagement portions of some or all of the plurality of appliance shells may be arranged to contact the convex surface at the same location, e.g., to reduce susceptibility of appliance performance to manufacturing tolerances.

In many embodiments, the attachment device comprises a single convex surface.

In many embodiments, the convex surface comprises a spherical, ellipsoidal, or cylindrical shape profile.

In many embodiments, each engagement portion of each appliance shell comprises a planar surface, and the repositioning force applied by each engagement portion is oriented along a direction substantially normal to the planar surface. The amount of friction between the planar surface of the engagement portion and the convex surface of the attachment device may be relatively low resulting in minimal or no tangential forces. In some embodiments, the planar surfaces of the at least some of the plurality of appliance shells are each arranged at different orientations relative to the convex surface.

In many embodiments, the different respective repositioning forces differ from each other with respect to one or more of location or orientation.

In many embodiments, the different respective repositioning forces are configured to reposition the tooth along a non-linear movement trajectory.

In many embodiments, each engagement portion is positioned so as to contact the convex surface of the attachment device at a single location.

In many embodiments, at least one of the plurality of appliance shells comprises a plurality of engagement portions positioned to contact the convex surface at a plurality of different locations.

In many embodiments, the attachment device further comprises a non-contacting surface that does not engage the plurality of appliance shells. The non-contacting surface may be a convex surface or a non-convex surface.

In many embodiments, the system further comprises a second plurality of appliance shells each shaped to receive the patient's teeth, each appliance shell of the second plurality of appliance shells comprising an engagement portion positioned to engage the convex surface of the attachment device so as to apply a repositioning force to the tooth, wherein the engagement portions of at least some of the second plurality of appliance shells are each arranged to contact the convex surface at the same location so as to apply similar repositioning forces to the tooth.

In another aspect, a computer-implemented method for processing tooth movement data in order to design an orthodontic system for repositioning a patient's teeth is provided. The computer system receives tooth movement data indicative of a movement trajectory for a tooth of the patient, and processes data including the tooth movement data so as to determine a geometry for an attachment device to be coupled to the tooth, the attachment device comprising a convex surface. The computer system further processes data including the tooth movement data so as to determine geometries for a plurality of appliance shells, each shaped to receive the patient's teeth. The plurality of appliance shells for which the geometries are determined each comprise an engagement portion positioned to engage the convex surface of the attachment device so as to apply a repositioning force to the tooth. Optionally, the engagement portions of at least some of the plurality of appliance shells may each be arranged to contact the convex surface at a different respective location so as to apply different respective repositioning forces to the tooth in order to move the tooth along the movement trajectory.

In many embodiments, the attachment device comprises a single convex surface.

In many embodiments, the convex surface comprises a spherical, ellipsoidal, or cylindrical surface profile.

In many embodiments, each engagement portion of each appliance shell comprises a planar surface, and the repositioning force applied by each engagement portion is oriented along a direction substantially normal to the planar surface. In some embodiments, the planar surfaces of the at least some of the plurality of appliance shells are each arranged at a different orientation relative to the convex surface.

In many embodiments, the different respective repositioning forces differ from each other with respect to one or more of location or orientation.

In many embodiments, the method further comprises calculating one or more forces or moments to move the tooth along the movement trajectory. The different repositioning forces applied correspond to at least a subset of the one or more forces or moments.

In many embodiments, the movement trajectory comprises a non-linear movement trajectory.

In many embodiments, the movement trajectory is configured to produce round-tripping of the tooth. As used herein, "round-tripping" may refer to a sequence of movements in which a tooth moves away from an initial position and/or orientation (e.g., to avoid colliding with another tooth) and then moves at least partially back towards the initial position and/or orientation.

In many embodiments, each engagement portion is positioned so as to contact the convex surface of the attachment device at a single location.

In many embodiments, at least one of the plurality of appliance shells comprises a plurality of engagement portions positioned to contact the convex surface at a plurality of different locations.

In many embodiments, the attachment device further comprises a non-contacting surface that does not engage the plurality of appliance shells. The non-contacting surface may be a convex surface or a non-convex surface.

In many embodiments, the method further comprises outputting digital data indicative of the determined geometries of the plurality of appliance shells.

In another aspect, an orthodontic appliance for repositioning a patient's teeth is provided. The appliance comprises an attachment device configured to be coupled to a tooth of the patient and comprising a convex surface, as well as a shell comprising a plurality of cavities shaped to receive the patient's teeth. At least one cavity of the plurality of cavities comprises a receptacle shaped to receive the attachment device, and the receptacle comprises a planar surface positioned to engage the convex surface of the attachment device so as to apply a repositioning force to the tooth. Optionally, the planar surface is positioned to engage the convex surface at a single location to apply the repositioning force to the tooth.

In many embodiments, the convex surface comprises a spherical, ellipsoidal, or cylindrical shape profile.

In many embodiments, the repositioning force applied by the planar surface is oriented along a direction substantially normal to the planar surface.

In many embodiments, the attachment device further comprises a non-contacting surface that does not engage the planar surface. The non-contacting surface may be a convex surface or a non-convex surface.

In another aspect, an orthodontic system for repositioning a patient's teeth is provided. The system comprises an attachment device configured to be coupled to a tooth of the patient and comprising a convex surface. The system also comprises a plurality of appliance shells each shaped to receive the patient's teeth, each appliance shell comprising an engagement portion positioned to engage the convex surface of the attachment device so as to apply a repositioning force to the tooth. In many embodiments, the engagement portions of at least some of the plurality of appliance shells are each arranged to contact the convex surface at the same location so as to apply repositioning forces to the tooth.

In many embodiments, the attachment device comprises a single convex surface.

In many embodiments, the convex surface comprises a spherical, ellipsoidal, or cylindrical shape profile.

In many embodiments, each engagement portion of each appliance shell comprises a planar surface, and the repositioning force applied by each engagement portion is oriented along a direction substantially normal to the planar surface. The amount of friction between the planar surface of the engagement portion and the convex surface of the attachment device may be relatively low resulting in minimal or no tangential forces. In some embodiments, the planar surfaces of the at least some of the plurality of appliance shells are arranged at the same orientation relative to the convex surface.

In many embodiments, each engagement portion is positioned so as to contact the convex surface of the attachment device at a single location.

In many embodiments, the attachment device further comprises a non-contacting surface that does not engage the plurality of appliance shells. The non-contacting surface may be a convex surface or a non-convex surface.

In many embodiments, the system further comprises a second plurality of appliance shells each shaped to receive the patient's teeth, each appliance shell of the second plurality of appliance shells comprising an engagement portion positioned to engage the convex surface of the attachment device so as to apply a repositioning force to the tooth, wherein the engagement portions of at least some of the second plurality of appliance shells are each arranged to contact the convex surface at a different location so as to apply different repositioning forces to the tooth.

In another aspect, a computer-implemented method for processing tooth movement data in order to design an orthodontic system for repositioning a patient's teeth is provided. The computer system receives tooth movement data indicative of a movement trajectory for a tooth of the patient, and processes data including the tooth movement data so as to determine a geometry for an attachment device to be coupled to the tooth, the attachment device comprising a convex surface. The computer system further processes data including the tooth movement data so as to determine geometries for a plurality of appliance shells, each shaped to receive the patient's teeth. The plurality of appliance shells for which the geometries are determined each comprise an engagement portion positioned to engage the convex surface of the attachment device so as to apply a repositioning force to the tooth. Optionally, the engagement portions of at least some of the plurality of appliance shells may each be arranged to contact the convex surface at the same location so as to apply repositioning forces to the tooth in order to move the tooth along the movement trajectory.

In many embodiments, the attachment device comprises a single convex surface.

In many embodiments, the convex surface comprises a spherical, ellipsoidal, or cylindrical surface profile.

In many embodiments, each engagement portion of each appliance shell comprises a planar surface, and the repositioning force applied by each engagement portion is oriented along a direction substantially normal to the planar surface. In some embodiments, the planar surfaces of the at least some of the plurality of appliance shells are each arranged at the same orientation relative to the convex surface.

In many embodiments, the method further comprises calculating one or more forces or moments to move the tooth along the movement trajectory. The repositioning forces applied correspond to at least a subset of the one or more forces or moments.

In many embodiments, each engagement portion is positioned so as to contact the convex surface of the attachment device at a single location.

In many embodiments, the attachment device further comprises a non-contacting surface that does not engage the plurality of appliance shells. The non-contacting surface may be a convex surface or a non-convex surface.

In many embodiments, the method further comprises outputting digital data indicative of the determined geometries of the plurality of appliance shells.

The embodiments disclosed herein are well suited for combination with one or known commercially available tooth moving components such as attachments and polymeric shell appliances. In many embodiments, the appliance and one or more attachments are configured to move one or more teeth along a tooth movement vector comprising six degrees of freedom, in which three degrees of freedom are rotational and three degrees of freedom are translation.

The present disclosure provides orthodontic systems and related methods for designing and providing improved or more effective tooth moving systems for eliciting a desired tooth movement and/or repositioning teeth into a desired arrangement.

Although reference is made to an appliance comprising a polymeric shell appliance, the embodiments disclosed herein are well suited for use with many appliances that receive teeth, for example appliances without one or more of polymers or shells. The appliance can be fabricated with one or more of many materials such as metal, glass, reinforced fibers, carbon fiber, composites, reinforced composites, aluminum, biological materials, and combinations thereof for example. The appliance can be shaped in many ways, such as with thermoforming or direct fabrication (e.g., 3D printing, additive manufacturing), for example. Alternatively or in combination, the appliance can be fabricated with machining such as an appliance fabricated from a block of material with computer numeric control machining.

Orthodontic systems of the present disclosure can include tooth attachments and one or more orthodontic appliances that engage the attachments when worn by a patient. Appliances having teeth receiving cavities that receive and reposition teeth, e.g., via application of force due to appliance resiliency, are generally illustrated with regard to FIG. 1A. FIG. 1A illustrates an exemplary tooth repositioning appliance or aligner 100 that can be worn by a patient in order to achieve an incremental repositioning of individual teeth 102 in the jaw. The appliance can include a shell (e.g., a continuous polymeric shell or a segmented shell) having teeth-receiving cavities that receive and resiliently reposition the teeth. An appliance or portion(s) thereof may be indirectly fabricated using a physical model of teeth. For example, an appliance (e.g., polymeric appliance) can be formed using a physical model of teeth and a sheet of suitable layers of polymeric material. In some embodiments, a physical appliance is directly fabricated, e.g., using rapid prototyping fabrication techniques, from a digital model of an appliance. An appliance can fit over all teeth present in an upper or lower jaw, or less than all of the teeth. The appliance can be designed specifically to accommodate the teeth of the patient (e.g., the topography of the tooth-receiving cavities matches the topography of the patient's teeth) and may be fabricated based on positive or negative models of the patient's teeth generated by impression, scanning, and the like. Alternatively, the appliance can be a generic appliance configured to receive the teeth, but not necessarily shaped to match the topography of the patient's teeth. In some cases, only certain teeth received by an appliance will be repositioned by the appliance while other teeth can provide a base or anchor region for holding the appliance in place as it applies force against the tooth or teeth targeted for repositioning. In some cases, some or most, and even all, of the teeth will be repositioned at some point during treatment. Teeth that are moved can also serve as a base or anchor for holding the appliance as it is worn by the patient. Typically, no wires or other means will be provided for holding an appliance in place over the teeth. In some cases, however, it may be desirable or necessary to provide individual attachments or other anchoring elements 104 on teeth 102 with corresponding receptacles or apertures 106 in the appliance 100 so that the appliance can apply a selected force on the tooth. Exemplary appliances, including those utilized in the Invisalign® System, are described in numerous patents and patent applications assigned to Align Technology, Inc. including, for example, in U.S. Pat. Nos. 6,450,807, and 5,975,893, as well as on the company's website, which is accessible on the World Wide Web (see, e.g., the url "invisalign.com"). Examples of tooth-mounted attachments suitable for use with orthodontic appliances are also described in patents and patent applications assigned to Align Technology, Inc., including, for example, U.S. Pat. Nos. 6,309,215 and 6,830,450.

Figure 1B:
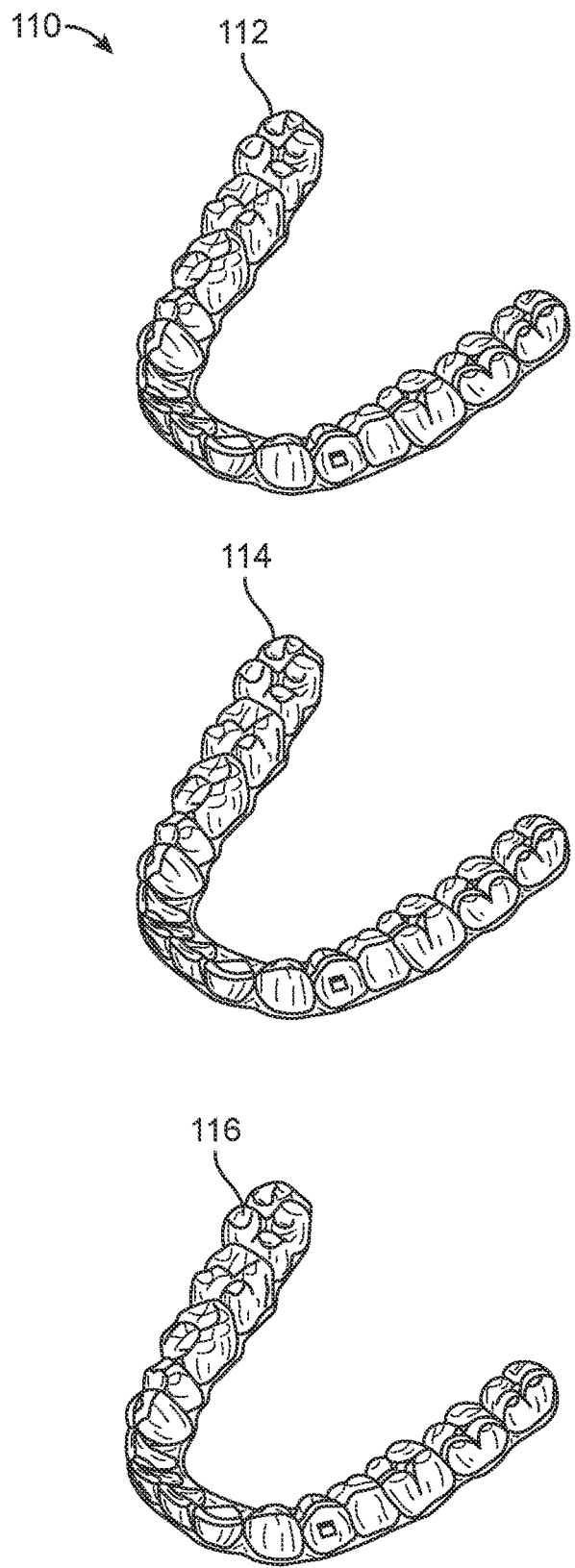
FIG. 1B illustrates a tooth repositioning system, in accordance with many embodiments.

FIG. 1B illustrates a tooth repositioning system 110 including a plurality of appliances 112, 114, 116. Any of the appliances described herein can be designed and/or provided as part of a set of a plurality of appliances used in a tooth repositioning system. Each appliance may be configured so a tooth-receiving cavity has a geometry corresponding to an intermediate or final tooth arrangement intended for the appliance. The patient's teeth can be progressively repositioned from an initial tooth arrangement to a target tooth arrangement by placing a series of incremental position adjustment appliances over the patient's teeth. For example, the tooth repositioning system 110 can include a first appliance 112 corresponding to an initial tooth arrangement, one or more intermediate appliances 114 corresponding to one or more intermediate arrangements, and a final appliance 116 corresponding to a target arrangement. A target tooth arrangement can be a planned final tooth arrangement selected for the patient's teeth at the end of all planned orthodontic treatment. Alternatively, a target arrangement can be one of some intermediate arrangements for the patient's teeth during the course of orthodontic treatment, which may include various different treatment scenarios, including, but not limited to, instances where surgery is recommended, where interproximal reduction (IPR) is appropriate, where a progress check is scheduled, where anchor placement is best, where palatal expansion is desirable, where restorative dentistry is involved (e.g., inlays, onlays, crowns, bridges, implants, veneers, and the like), etc. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages.

The various embodiments of the orthodontic appliances presented herein can be fabricated in a wide variety of ways. As an example, some embodiments of the appliances herein (or portions thereof) can be produced using indirect fabrication techniques, such as by thermoforming over a positive or negative mold. Indirect fabrication of an orthodontic appliance can involve producing a positive or negative mold of the patient's dentition in a target arrangement (e.g., by rapid prototyping, milling, etc.) and thermoforming one or more sheets of material over the mold in order to generate an appliance shell. Alternatively or in combination, some embodiments of the appliances herein may be directly fabricated, e.g., using rapid prototyping, stereolithography, 3D printing, and the like.

The configuration of the orthodontic appliances herein can be determined according to a treatment plan for a patient, e.g., a treatment plan involving successive administration of a plurality of appliances for incrementally repositioning teeth. Computer-based treatment planning and/or appliance manufacturing methods can be used in order to facilitate the design and fabrication of appliances. For instance, one or more of the appliance components described herein can be digitally designed and fabricated with the aid of computer-controlled manufacturing devices (e.g., computer numerical control (CNC) milling, computer-controlled rapid prototyping such as 3D printing, etc.). The computer-based methods presented herein can improve the accuracy, flexibility, and convenience of appliance fabrication.

In many embodiments, orthodontic appliances, such as the appliance illustrated in FIG. 1A, impart forces to the crown of a tooth and/or an attachment positioned on the tooth at one or more points of contact between a tooth receiving cavity of the appliance and received tooth and/or attachment. The magnitude of each of these forces and/or their distribution on the surface of the tooth can determine the type of orthodontic tooth movement which results. Tooth movements may be in any direction in any plane of space and may comprise one or more of rotation or translation along one or more axes. Types of tooth movements include extrusion, intrusion, rotation, tipping, translation, and root movement, and combinations thereof. Tooth movement of the crown greater than the movement of the root can be referred to as tipping. Equivalent movement of the crown and root can be referred to as translation. Movement of the root greater than the crown can be referred to as root movement.

Figure 2:
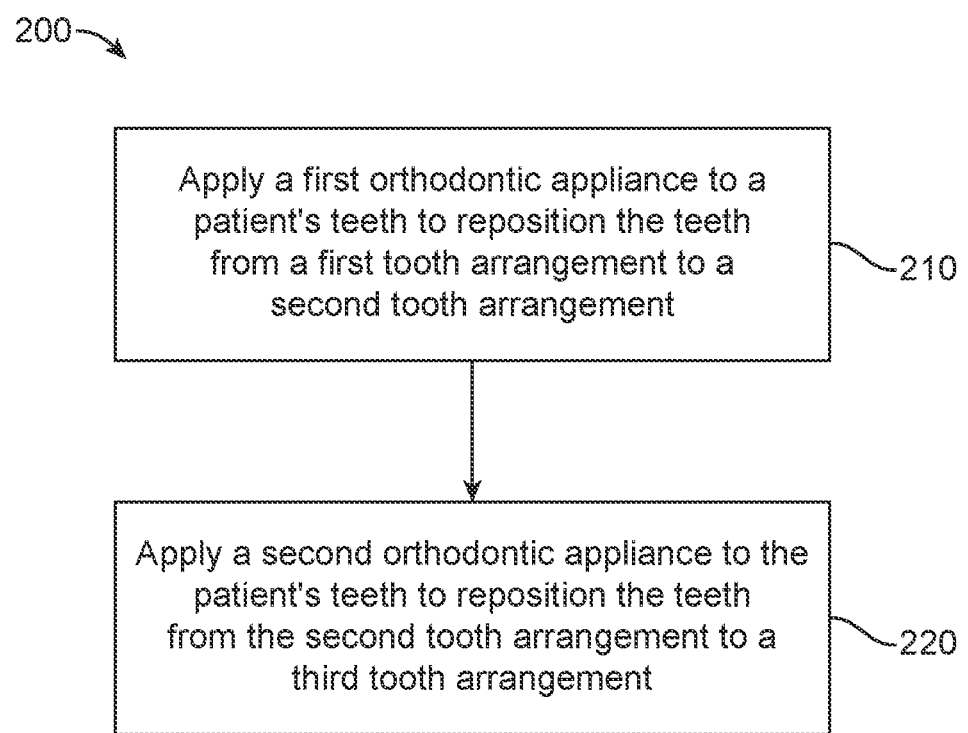
FIG. 2 illustrates a method of orthodontic treatment using a plurality of appliances, in accordance with many embodiments.

FIG. 2 illustrates a method 200 of orthodontic treatment using a plurality of appliances, in accordance with many embodiments. The method 200 can be practiced using any of the appliances or appliance sets described herein. In step 210, a first orthodontic appliance is applied to a patient's teeth in order to reposition the teeth from a first tooth arrangement to a second tooth arrangement. In step 220, a second orthodontic appliance is applied to the patient's teeth in order to reposition the teeth from the second tooth arrangement to a third tooth arrangement. The method 200 can be repeated as necessary using any suitable number and combination of sequential appliances in order to incrementally reposition the patient's teeth from an initial arrangement to a target arrangement. The appliances can be generated all at the same stage or time point, in sets or batches (e.g., at the beginning of one or more stages of the treatment), or one at a time, and the patient can wear each appliance until the pressure of each appliance on the teeth can no longer be felt or until the maximum amount of expressed tooth movement for that given stage has been achieved. A plurality of different appliances (e.g., a set) can be designed and even fabricated prior to the patient wearing any appliance of the plurality. After wearing an appliance for an appropriate period of time, the patient can replace the current appliance with the next appliance in the series until no more appliances remain. The appliances are generally not affixed to the teeth and the patient may place and replace the appliances at any time during the procedure (e.g., patient-removable appliances). The final appliance or several appliances in the series may have a geometry or geometries selected to overcorrect the tooth arrangement. For instance, one or more appliances may have a geometry that would (if fully achieved) move individual teeth beyond the tooth arrangement that has been selected as the "final." Such over-correction may be desirable in order to offset potential relapse after the repositioning method has been terminated (e.g., permit movement of individual teeth back toward their pre-corrected positions). Over-correction may also be beneficial to speed the rate of correction (e.g., an appliance with a geometry that is positioned beyond a desired intermediate or final position may shift the individual teeth toward the position at a greater rate). In such cases, the use of an appliance can be terminated before the teeth reach the positions defined by the appliance. Furthermore, over-correction may be deliberately applied in order to compensate for any inaccuracies or limitations of the appliance.

The orthodontic systems described herein can include one or more tooth-mounted attachment devices (also referred to herein as "attachments") that engage a portion of an orthodontic appliance, such as a shell appliance, in order to apply a force to the underlying tooth. An attachment device can be fabricated using various methods. For example, a pre-formed attachment device (e.g., directly fabricated by rapid prototyping, 3D-printing, etc.) having a specified geometry can be bonded to the patient's tooth at a target location on the tooth surface using light-curable adhesives and the like. Alternatively, the attachment can be formed in situ on the patient's tooth using a template having a recess defining the attachment geometry, the recess being filled with a curable material. In many embodiments, the template is a shell appliance that, when worn on the patient's teeth, positions the recess filled with material over the target location on the tooth surface. The material can then be cured, e.g., with light energy, in order to form and bond the attachment to the tooth surface.

Use of attachment devices may be advantageous for exerting repositioning forces that would otherwise be difficult to achieve using a shell appliance alone. In many embodiments, an attachment device includes one or more surfaces arranged to engage (e.g., contact) a corresponding portion of an appliance shell when the shell is worn on patient's teeth, and the engagement between the attachment surface(s) and shell portion can produce forces that elicit tooth movement. The geometry (e.g., size, shape) and/or location (e.g., position, orientation) of the attachment device can be varied as desired to produce the desired tooth movement force(s). For example, the attachment devices herein can be any suitable shape, such as a portion of a sphere, ellipse, ovoid, cylinder, or a curved and/or flat polyhedral shape. In many embodiments, the portion of the appliance that touches the tooth may be shaped to substantially match the shape of the tooth surface. Similarly, as described above and herein, the surface(s) of an attachment device that engage the appliance can have any suitable shape, such as a spherical, ellipsoidal, or cylindrical shape profile, or even further profiles that comprise a substantially convex curve along at least one dimension. In some embodiments, at least one surface of an attachment device that engages the appliance may be substantially planar.

In many embodiments, the appliance shell is shaped to accommodate the attachment device when the shell is placed on the patient's teeth. For example, the appliance shell can include an engagement portion positioned to engage (e.g., contact) one or more surfaces of the attachment device. Optionally, the engagement portion can be part of a receptacle or recess in the appliance shell that receives the attachment or a portion thereof. The engagement portion can have any suitable shape, such as substantially planar, convex, or even concave surfaces. The engagement portion can have a shape complementary to that of the attachment surface(s) in order to provide mating contact with the surface(s) when the appliance is worn, e.g., a planar engagement portion is used in combination with a planar attachment surface. The engagement portion can alternately have a shape that differs substantially from the shape of the attachment surface, such as an engagement portion comprising a substantially planar surface in combination with a convex attachment surface, or a convex appliance surface in combination with a substantially planar attachment surface. In many embodiments, the engagement portion of the appliance includes a surface having a curvature that differs from the curvature of the corresponding attachment surface(s).

The various surfaces of attachments and appliances are described herein variously using terms such as "planar," "convex," or "concave." It will be further understood that when using each of these terms, included in the idea are surfaces substantially similar to such surfaces. Thus, planar surfaces as described herein include substantially planar surfaces, convex surfaces include substantially convex surfaces, and concave surfaces include substantially concave surfaces. In some embodiments, surface irregularities or roughness, such as those due to manufacturing limitations, may be ignored in defining convex, concave, or planar surfaces if they are small compared to the size of the surface as a whole (e.g., at least one or two orders of magnitude smaller). Thus, for example, an approximately ellipsoidal surface portion with a surface area of 4 square mm and a depth of 1 mm from edge to outermost point would be considered to be a substantially convex surface, even if it had surface irregularities, for example, on the 0.1 mm scale.

The curvature of a convex surface, such as a convex surface of an attachment, may be chosen in a variety of ways. For example, the convex surface may be shaped like a portion of a sphere or an ellipsoid or may be a shape substantially similar to such a surface, such as ovoid shapes, for example. Other surfaces may be also chosen, such as portions of cylindrical surfaces, which may be used to allow variable force directions around the radius of the cylinder without allowing substantial variation along the axis of the cylinder.

The curvature of an attachment surface or appliance surface can be characterized in a variety of ways. For example, the degree of concavity or convexity may be determined based on the radius of curvature of the surface. In some embodiments, a concave or convex surface of an attachment or appliance has a radius of curvature less than or equal to about 10 mm, less than or equal to about 50 mm, less than or equal to about 100 mm, less than or equal to about 150 mm, or less than or equal to about 200 mm. In some embodiments, the radius of curvature is within a range from about 0.5 mm to about 10 mm, within a range from about 1 mm to about 10 mm, within a range from about 3 mm to about 10 mm, within a range from about 10 mm to about 50 mm, within a range from about 10 mm to about 100 mm, within a range from about 10 mm to about 200 mm, within a range from about 50 mm to about 100 mm, within a range from about 50 mm to about 150 mm, within a range from about 50 mm to about 200 mm, within a range from about 100 mm to about 150 mm, or within a range from about 150 mm to about 200 mm. In some embodiments, a planar surface of an attachment or appliance has as radius of curvature of greater than or equal to about 10 mm.

In some embodiments, the degree of concavity or convexity of an attachment surface may be determined based on the ratio of the radius of curvature of the surface to the half-size of the attachment. The term "half-size" may be used herein to refer to the radius of the circle having a surface area equivalent to the lateral surface area (e.g., surface area attached to the tooth surface) of the attachment. In some embodiments, a convex or concave attachment surface has a radius of curvature that is approximately the same order of magnitude as the half-size of the attachment. In some embodiments, the ratio of radius of curvature to half-size for a convex or concave attachment surface is less than or equal to about 50. In some embodiments, the ratio of radius of curvature to half-size for a planar attachment surface is greater than or equal to about 50.

As another example, the ratio of the depth to a size of a surface may be used to characterize it as substantially planar, convex, or concave. The size of a surface may be determined by taking the square root of its area. The depth of a surface may be determined as follows: given a plane that minimizes the mean square distance from the plane to the perimeter of the surface, the depth is the sum of the distances in each direction from that plane to the farthest point on the surface. In some embodiments, the attachments herein include convex surfaces wherein the size-to-depth ratio is within a range from about 1:100 to about 1:10, or within a range from about 1:10 to about 1:2. In further embodiments, an attachment can have a convex surface with a size-to-depth ratio of about 1, or within a range from about ½ to about 2, or even larger ratios, such as within a range from about 2 to about 10, within a range from about 10 to about 100, or even greater.

Figure 3:
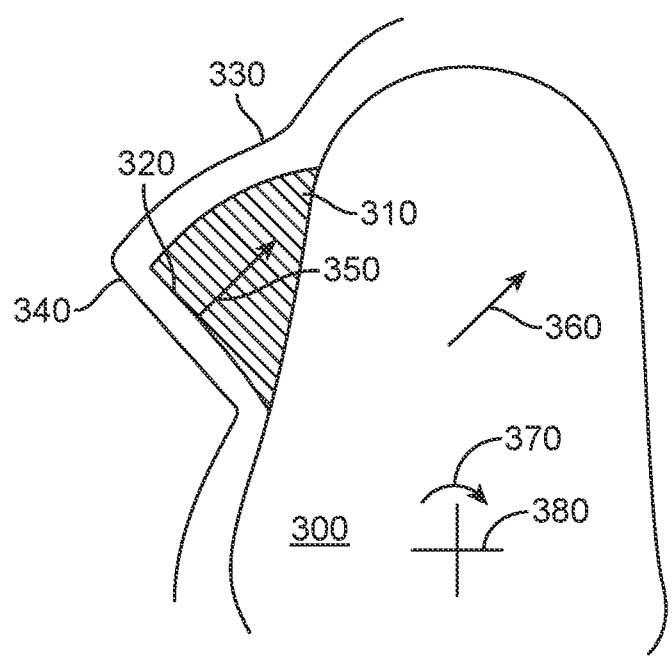
FIG. 3 illustrates the interface between an attachment comprising a planar surface and an engagement portion of an appliance comprising a planar surface, in accordance with many embodiments.

FIG. 3 illustrates the interface between an attachment comprising a planar surface and an engagement portion of an appliance comprising a planar surface. An attachment 310 comprising a planar surface 320 is bonded to a tooth 300. Part of an orthodontic shell appliance 330 is shown as worn in the mouth of a patient, the appliance having an engagement portion comprising a planar surface 340. Optionally, the appliance 330 can include a recess or receptacle shaped to receive the attachment 310 or a portion thereof, and the planar surface 340 of the engagement portion can form part of the recess or receptacle. The orthodontic appliance 330 is designed such that when worn, the planar surface 340 of the engagement portion engages the planar surface 320 of the attachment 310. This engagement produces a force 350 on the attachment 310. Because the attachment 310 is bonded to the tooth 300, the force 350 causes a tooth moving force 360, and may also apply a moment 370 on the tooth 300.

The magnitude and direction of the tooth moving force 360 may be determined by the shape and/or material properties of the orthodontic appliance 330 and of the attachment 310. The magnitude of the tooth moving force 360 may depend on the elasticity of the appliance 330, the attachment (e.g., the attachment 310 is typically a relatively rigid material compared to the appliance), and the degree to which the planar appliance surface 340 is deflected from its unloaded or rest state when it comes into contact with the planar attachment surface 320. The direction of the tooth moving force may be determined by the angle at which the attachment surface 320 and appliance surface 340 come into contact. In some embodiments, friction may be relatively low for appliance and attachment surfaces contacting within a patient's mouth, so the force 350, as well as corresponding tooth moving force 360, will point in a direction substantially normal to the engaged appliance and attachment surfaces, which may be designed to be parallel or substantially parallel to each other.

The moment 370 may be determined by the magnitude and direction of the tooth moving force 360 as well as the displacement vector from the center of rotation 380 of the tooth to the location of engagement between surfaces 320 and 340, e.g., as a vector cross-product of the tooth moving force 360 and the displacement vector. In embodiments where planar surfaces such as appliance surface 340 and attachment surface 320 are designed to be parallel, the contact location of the surfaces may be approximated as the center of the two surfaces. However, if the two surfaces contact each other at an unintended location, for example due to imperfect fabrication of the appliance and/or attachment, undesired forces and moments can be produced. For example, if an appliance and an attachment are fabricated with planar surfaces that are not substantially parallel, they may only contact at the edge of the surfaces, rather than continuously across the center of the surfaces as intended. This can result in forces and/or moments that differ dramatically from the expected values, which may in turn lead to an unwanted tooth movement.

FIGS. 4A and 4B illustrate how small errors in appliance fabrication can lead to large changes in the location of interaction between a planar appliance surface and a planar attachment surface.

FIG. 4A illustrates an appliance 430 with an engagement portion comprising an appliance surface 440 configured to engage an attachment surface 420 of a dental attachment 410. In the depicted embodiment, the intended appliance surface 441 is oriented parallel to the attachment surface 420, in order to produce a desired force 450 at or near the center 451 of the attachment surface. However, if the actual appliance surface 440 is oriented at an angle rotated counterclockwise from the intended surface 441, e.g., due to imperfect manufacturing, the appliance instead produces a force 452 located near the end of the attachment surface 420, at contact location 453. Because the engagement surfaces are substantially planar, even a very small change in angle of the appliance surface 440 can cause a large difference in contact location. This can result in a moment vector being applied to the tooth that is significantly different from the desired value.

FIG. 4B shows a similar problem that can occur when the angle of an appliance surface has an error in the opposite direction. An appliance 435 with an engagement portion comprising an appliance surface 445 is configured to engage an attachment surface 425 of a dental attachment 415. The intended appliance surface 446 is parallel to the attachment surface 425, in order to produce a desired force 455. This is illustrated by intended surface 446. However, if the actual appliance surface 445 is oriented at an angle rotated clockwise from the intended surface 446, e.g., due to imperfect manufacturing, the appliance instead produces a force 457 located near the end of the attachment surface 425, at contact location 458. Because the attachment and appliance surfaces are planar, even a very small change in angle of the appliance surface 440 can cause a large difference in contact location. This can result in a moment vector being applied to the tooth that is significantly different from the desired value. Furthermore, because the contact location 458 is at an edge of the attachment surface 425, the magnitude and direction of the resulting force 457 may differ significantly from the desired force 455. Furthermore, the sharp attachment corner at contact location 458 can cause the magnitude of resulting force 457 to depend strongly on the shape of the attachment corner, such that small manufacturing imperfections can lead to large changes in force magnitude and/or direction.

As illustrated by FIGS. 4A and 4B, the use of attachments with planar surfaces to engage appliances with planar surfaces can lead to difficulties in creating desired forces and moments, with small manufacturing defects or variations leading to large changes in force and/or moment. Such manufacturing defects or variations may arise due to inaccuracies in fabricating the appliance (e.g., by direct fabrication or indirect fabrication via thermoforming over a mold), as well as inaccuracies in fabricating the attachment device, and can result in an appliance and/or attachment geometry that differs from the intended geometry (e.g., with respect to shape, position, and/or orientation). Furthermore, even absent manufacturing defects, providing proper engagement between attachment and appliance means that planar attachment surfaces may be limited in the range of planar appliance surfaces they can engage. For example, if the two planes are not substantially parallel, they may interact in unpredictable or undesirable ways. When friction is relatively low, a configuration of parallel planes can be limited in some instances to only producing a force in a single direction: substantially normal to the surface of the attachment.

In some embodiments, the attachment devices and appliances disclosed herein address these issues by replacing the engaged planar surface of an attachment with a convex surface, allowing different appliances to be manufactured to produce different forces, while also making the system as a whole more robust against manufacturing defects.

Figure 5A:
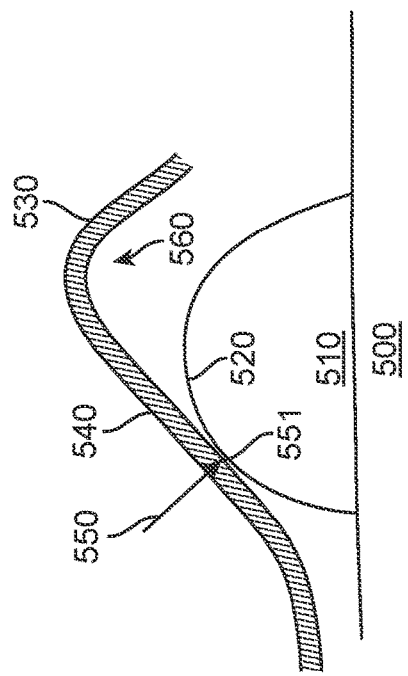
FIG. 5A illustrates an attachment with a convex surface and an appliance configured to engage that surface, in accordance with many embodiments.

FIG. 5A illustrates an attachment with a convex surface and a portion of an appliance shell configured to engage that surface, in accordance with embodiments. An attachment 510 with a convex attachment surface 520 is bonded to a tooth 500. The attachment 510 can be used in conjunction with an appliance shell 530 with a receptacle to accommodate and receive the attachment 510. The appliance 530 includes an engagement portion comprising an appliance surface 540 that contacts the convex attachment surface 520 at contact location 551, generating a force 550 on the attachment 510, and thus a similar tooth moving force on the tooth 500 to which the attachment is bonded.

In many embodiments, the engagement portion of the appliance comprises an appliance surface 540 that is substantially planar, as depicted. However, in alternative embodiments, it may also be designed to be convex (bending away from the attachment), or even concave (bending toward the attachment). In embodiments where the engagement surface is concave, the magnitude of its curvature may be less than that of the convex attachment surface so as to permit contact with the convex attachment surface at a single location. The curvature of the appliance and the attachment away from the contact location may be varied as desired. For example, in some embodiments, appliance 530 also comprises a concave portion 560 with greater curvature than the convex attachment engagement surface 520, but because the concave portion 560 does not engage the convex attachment engagement surface 520, the force applied by the contact between the appliance and the attachment is not affected. One of ordinary skill in the art would appreciate that since the inner surface of the appliance contacts the outer surface of the attachment, a convex attachment engagement surface has the same absolute direction of curvature as a concave appliance engagement surface, and vice versa.

In the depicted embodiment, the appliance surface 540 is arranged to contact the convex attachment surface 520 at a single location 551 on the attachment 510 such that the force 550 is applied to the tooth 500 localized about that location. The position of contact location 551 is determined by the shape of the convex attachment surface 520 and the slope of the appliance surface 540: in the case of a planar appliance engagement surface, for example, the two may contact at the point where the appliance surface is substantially tangent to the attachment surface. The direction of force can likewise be determined by the two surfaces: when friction is low, the force 550 may be determined to be in a direction substantially normal to the two engagement surfaces at their contact location 551, with minimal or no force components are produced along the direction tangential to the attachment surface. "Substantially normal" may be used herein to refer to an angle within a range from about 89° to about 91°, from about 85° to about 95°, or from about 75° to about 105°. Thus, it can be appreciated that the direction of the applied tooth moving force can be determined- and varied—by varying the location and orientation of the appliance surface relative to the attachment device, thereby changing both the location and orientation of the resultant tooth moving force.

Figure 5B:
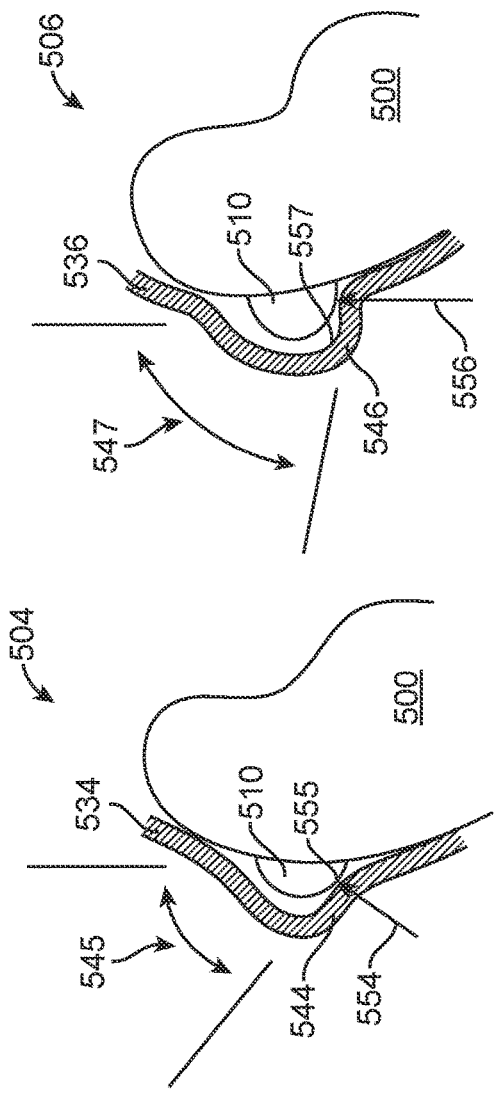
FIG. 5B illustrates a plurality of appliances, each configured with a surface at a different angle so as to contact a single attachment at different locations, thereby applying different forces, in accordance with many embodiments.
Figure 5B:
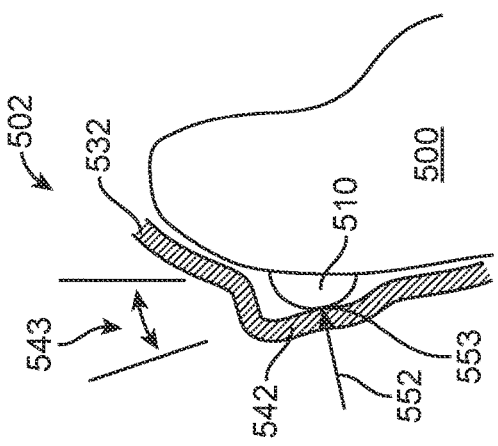

FIG. 5B illustrates a plurality of appliances, each configured with a surface at a different angle so as to contact a single attachment at different locations, thereby applying different forces, in accordance with embodiments. In each of configurations 502, 504, and 506, a different respective shell appliance 532, 534, and 536 engages the same attachment 510. Each appliance has a respective engagement portion comprising an appliance surface 542, 544, and 546, each surface being oriented at a different respective angle 543, 545, and 547. The different angles of the surfaces of appliances 532, 534, and 536 cause the engagement portion of each appliance to engage the convex surface of attachment 510 at a different respective location 553, 555, and 557, thereby producing different respective tooth moving forces 552, 554, and 556, in a direction substantially normal to the respective appliance surfaces 542, 544, and 546. Due to the different contact locations 553, 555, and 557, in conjunction with the different tooth moving forces 552, 554, and 556, it will likewise be appreciated that each appliance applies a different moment to the tooth as well. Thus, a single attachment comprising a convex surface may be used to produce a plurality of different forces and/or a plurality of different moments, by sequentially contacting a plurality of appliances to the attachment at different locations. It will be appreciated that in many embodiments, the force direction applied by each appliance shell may be independently chosen from a substantially continuous distribution by designing the appliance such that the engagement portion contacts the attachment surface at a location chosen from a corresponding, substantially continuous distribution of contact locations along the attachment surface. This permits the movement of a tooth along a complex, continuously variable trajectory using only a single attachment, as discussed further herein.

In many embodiments, an attachment device comprises only a single continuous convex surface. In alternative embodiments, an attachment device may comprise a plurality of different surfaces. These surfaces may comprise multiple convex surfaces, or even mixes of convex, concave, and/or planar surfaces. In some embodiments, an appliance may be configured to concurrently engage a plurality of attachment surfaces, such as a plurality of convex attachment surfaces or even a mixture of attachment surfaces. For example, an appliance might concurrently and/or sequentially engage both convex and planar surfaces of an attachment. In some embodiments, the attachment device includes one or more non-contacting surfaces that do not engage (e.g., contact) any portion of the appliance surface when the appliance is worn by the patient. The geometry of a non-contacting surface may be varied as desired, e.g., planar, convex, or non-convex.

Figure 6:
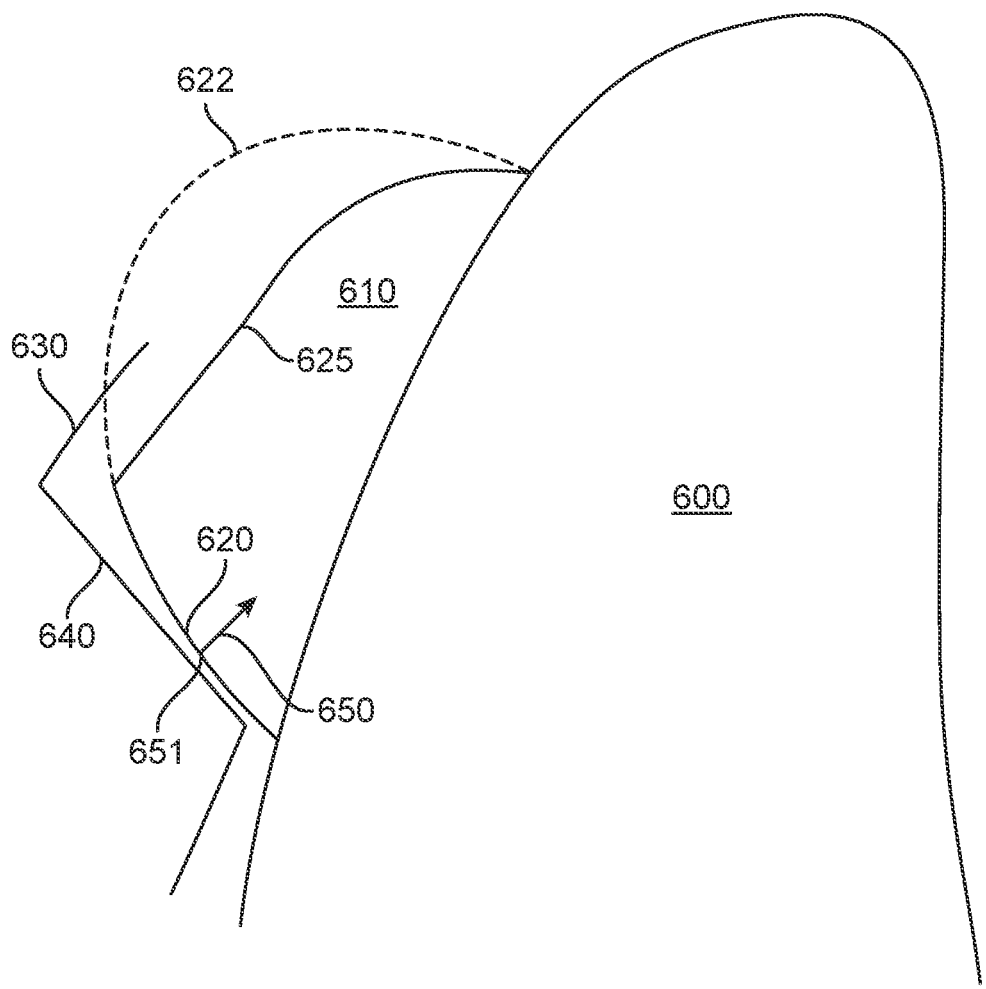
FIG. 6 illustrates an attachment comprising a convex surface and a non-contacting surface, in addition to an appliance with a surface configured to engage the convex surface, in accordance with many embodiments.

FIG. 6 illustrates a tooth 600 to which is bonded an attachment 610 comprising both a convex surface 620 and a non-contacting surface 625. FIG. 6 also illustrates an appliance 630 with an engagement portion comprising a surface 640 configured to engage the convex surface 620, in accordance with embodiments. As illustrated in the figure, the convex surface 620 protrudes outward, presenting a contact location 651 that is tangent to the appliance engagement surface 640, and at which the two will meet. The tooth moving force 650 applied by the appliance points in a direction substantially normal to both the appliance surface 640 and the convex attachment surface 620 at their point of contact 651. As can be readily appreciated, the direction of force may be varied smoothly by varying the angle of appliance surface 640, for example using a plurality of appliances, which will also correspondingly smoothly shift the point of contact 651.

The attachment 610 may also include a non-contacting surface 625 that does not engage (e.g., contact) the appliance 630, and therefore does not directly transmit force from the appliance 630 to the tooth 600. The geometry of the non-contacting surface 625 may be varied as desired (e.g., convex, concave, or planar). Further illustrated by a dotted line is alternative surface 622, which extends the convex surface 622 so that the entire exposed surface of attachment 610 would comprise a single convex surface. The attachment size and shape implied by alternative surface 622 may be too large for comfort or aesthetic reasons. Thus, it may be desirable in some embodiments to design attachments such as attachment 610 which only comprise convex surfaces where engagement with the appliance is desired, while eliminating unwanted volume where the appliance is not intended to engage the attachment so as to form non-contacting surfaces (e.g., surface 625).

In many embodiments, the appliances herein are designed to contact the convex surface of an attachment device at a single location. In alternative embodiments, an appliance can be designed to concurrently contact a single attachment device at a plurality of different locations, e.g., at 2, 3, 4, 5, or more different locations. In many embodiments, the different locations may be positioned along a single convex surface. In many embodiments, some of the different locations may be located on different sides of an attachment. In many embodiments, some of the different locations may be located on the same side of an attachment. In many embodiments, some of the different locations may be located on different convex surfaces of the attachment device. In many embodiments, one engagement portion of an appliance may contact a plurality of different locations on one or more attachment surfaces.

Figure 7A:
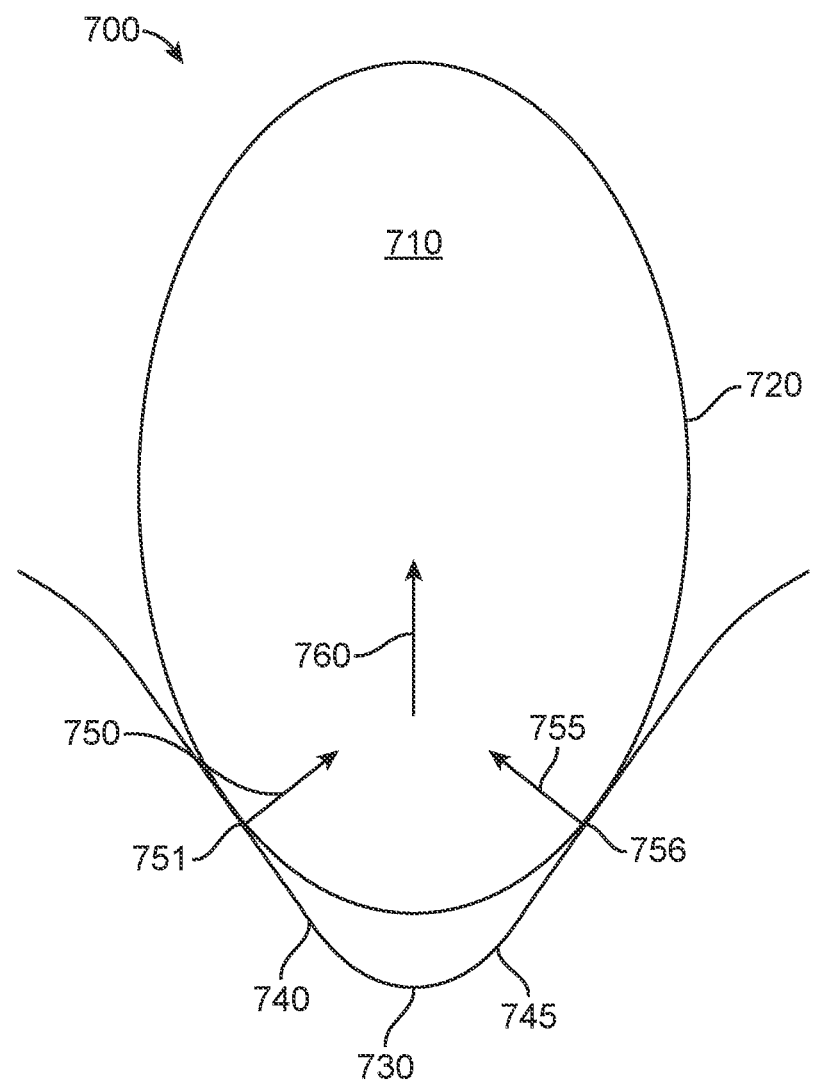
FIG. 7A illustrates an attachment with a convex surface and an appliance with a plurality of surfaces, each configured to concurrently contact the convex surface at different respective locations so as to apply a net force to a tooth, in accordance with many embodiments.

FIG. 7A illustrates an attachment with a convex surface and an appliance with a plurality of surfaces, each configured to concurrently contact the convex surface at different respective locations so as to apply a force to a tooth, in accordance with many embodiments. An attachment 710 (e.g., with an approximately ellipsoidal shape) is shown from a perspective facing toward the surface of a tooth 700, corresponding to the plane of the page. The attachment comprises a convex surface 720 configured to engage an appliance at a plurality of locations, wherein each location determines a particular force and a particular moment. In the illustrated embodiment, the attachment surface 720 is engaged by an appliance 730 with engagement portions comprising a plurality of surfaces 740 and 745. The appliance surfaces concurrently engage the convex surface 720 at separate respective contact locations 751 and 756, producing respective contact forces 750 and 755. In the depicted embodiment, these two forces add together to produce a net tooth moving force 760 pointing in an upwards direction. In alternative embodiments, the appliance may engage the attachment devices at other contact locations so as to produce forces in other directions. This configuration allows a net tooth moving force to be produced in a direction that is not substantially normal to either contacted surface. Furthermore, the different directions and locations of contact forces 750 and 755 may cause each to produce a moment on the tooth. The combination of these moments can produce a net moment which can have some components larger or smaller than those of either of the individual contacts, optionally at or near zero.

Figure 7B:
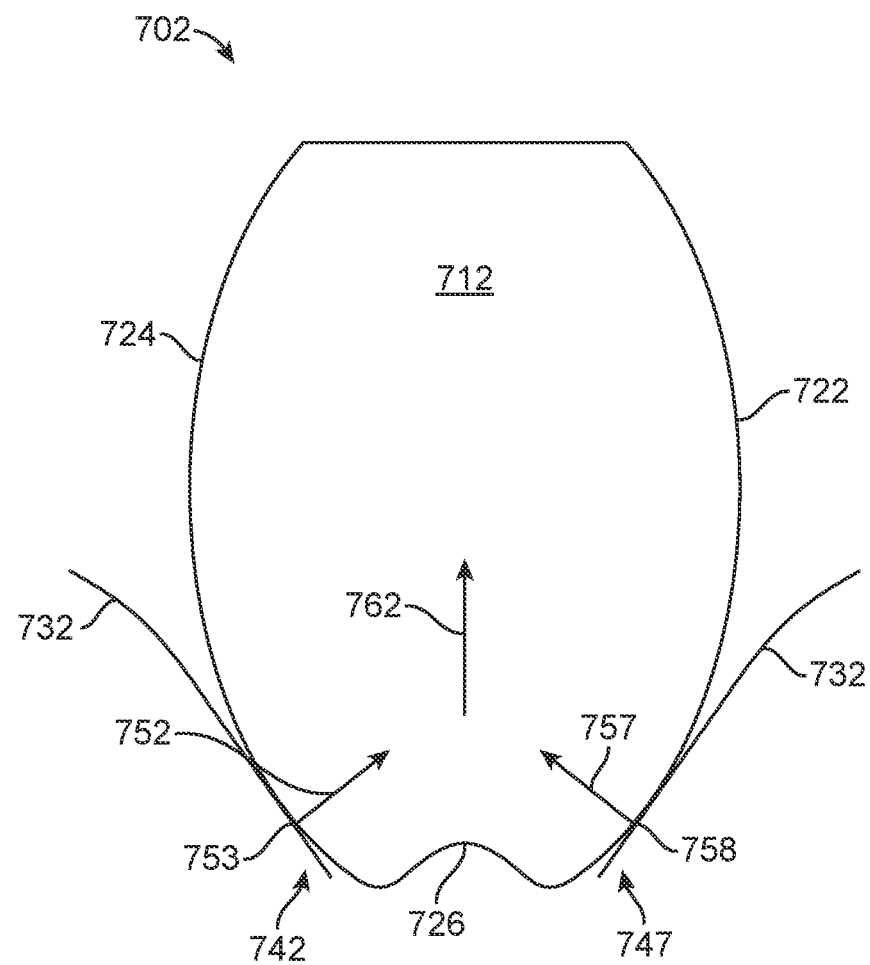
FIG. 7B illustrates an alternative configuration of the attachment and appliance of FIG. 7A, in which each appliance surface contacts a separate convex surface of the attachment, in accordance with many embodiments.

A further benefit of using more than one point of contact between appliance surfaces and convex attachment surfaces is to allow an appliance to apply tooth moving forces in directions where direct engagement with an attachment would be difficult to achieve or uncomfortable for the patient. FIG. 7B illustrates an alternative configuration of the attachment and appliance of FIG. 7A, in which each appliance surface contacts a separate convex surface of the attachment, in accordance with many embodiments. An attachment 712 with a plurality of convex attachment surfaces 722 and 724 is shown from a perspective facing toward the surface of a tooth 702, corresponding to the plane of the page. Convex surfaces 722 and 724 are configured to engage engagement portions of an appliance at a plurality of locations, wherein each location determines a particular force and a particular moment. The convex surfaces 722 and 724 are optionally separated by a non-convex surface 726, such that attachment 712 does not extend as far down from its center as attachment 710 of FIG. 7A. This feature can be useful in situations where size or shape of the attachment is constrained, for example, when an ellipsoidal attachment would extend too far towards the gum line of the patient or make an undercut shape that is difficult for a removable appliance to engage.

Each attachment surface 722 and 724 is respectively engaged by engagement portions of an appliance 732 with a plurality of respective surfaces 742 and 747. The appliance surfaces concurrently engage the respective convex surfaces 722 and 724 at separate respective contact locations 753 and 758, producing respective contact forces 752 and 757. In the depicted embodiment, these two forces add together to produce a net tooth moving force 762 pointing in an upwards direction. This configuration of appliance and attachment allows an upwards force, such as an extrusion force, to be applied to a tooth, for example, while keeping both the attachment and the appliance from extending too far towards the patient's gum line. In alternative embodiments, the appliance may engage the attachment devices at other contact locations so as to produce forces in other directions.

Figure 7C:
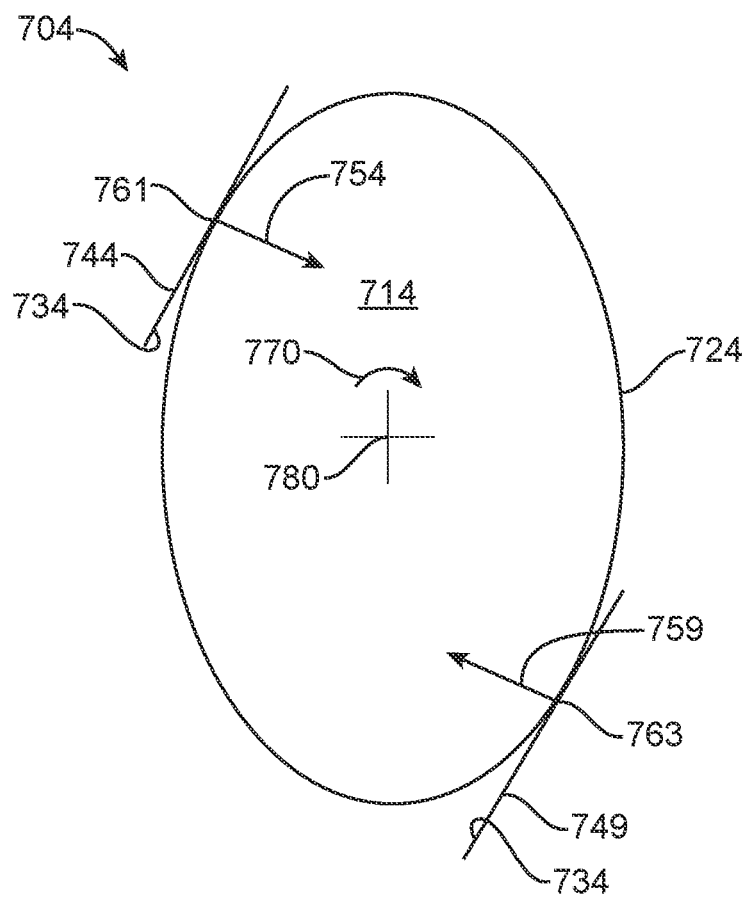
FIG. 7C illustrates an attachment with a convex surface and an appliance with a plurality of surfaces, each configured to concurrently contact the convex surface at different respective locations so as to apply a net moment to a tooth, in accordance with many embodiments.

FIG. 7C illustrates an attachment with a convex surface and an appliance with a plurality of surfaces, each configured to concurrently contact the convex surface at different respective locations so as to apply a net moment to a tooth, in accordance with many embodiments. An attachment 714 (e.g., with an approximately ellipsoidal shape) is shown from a perspective facing toward the surface of a tooth 704, corresponding to the plane of the page. The attachment comprises a convex surface 724 configured to engage an appliance at a plurality of locations, wherein each location determines a particular force and a particular moment. In the illustrated embodiment, the attachment surface 724 is engaged by an appliance 734 with engagement portions comprising a plurality of surfaces 744 and 749. The appliance surfaces concurrently engage the convex surface 724 at separate respective contact locations 761 and 763, producing respective contact forces 754 and 759. These two forces may be about equal in magnitude and approximately opposite in direction, so they produce a net force of about zero. However, due to their different contact locations 761 and 763, they produce respective moments that add together to produce a moment 770 in a clockwise direction about center of rotation 780. This configuration allows a moment to be produced by contacting a single attachment with surfaces of a single appliance without needing to apply a tooth moving force. Although the attachment is illustrated here as approximately ellipsoidal with a single convex surface similar to that of FIG. 7A, other shapes may readily be used, including shapes with separate convex surfaces such as illustrated in FIG. 7B. It will be further appreciated that the elements illustrated in FIGS. 7A-C may be freely combined; for example, to allow both a net force and a net moment to be independently determined by concurrently contacting the convex surfaces of an attachment with engagement surfaces of an appliance at one, two, or even more locations. Additionally, other forces may also be applied to the attachment or tooth in combination with those depicted in FIGS. 7A-C, e.g., to inhibit undesirable tooth movements, as would be understood by one of ordinary skill in the art.

It will be understood by one of skill in the art that in some embodiments the roles played by the attachment and the appliance may be reversed; for example, the attachment may comprise a planar surface engaged by an appliance engagement portion comprising a convex appliance surface. This reversed design allows the application of a plurality of parallel tooth-moving forces, each substantially normal to the planar attachment surface, and each arising from a different contact point. This allows a variable moment to be applied to a tooth while applying tooth moving forces that may be similar in direction and/or magnitude. Further embodiments may employ attachments that have a mix of engagement surface types—for example, some convex surfaces and some planar surfaces—in order to further customize the forces and moments that may be applied to the patient's tooth. In each case, one or more appliances may be fabricated to properly engage the respective attachment surfaces; for example, in some cases convex attachment surfaces may be engaged by planar appliance surfaces while planar attachment surfaces are engaged by convex appliance surfaces. In some cases, different attachment surface types may be engaged concurrently, in a manner similar to that depicted in FIGS. 7A and 7B, in order to provide differential moments and/or combined forces.

FIGS. 8A-8D illustrate the reduced sensitivity of attachments engaged on convex surfaces to manufacturing variations, compared to attachments engaged on planar surfaces. As described further herein, this reduced sensitivity allows a more accurate and reliable application of tooth moving force. This can allow more precise tooth movements to be performed, as well as decrease the rate at which unintended tooth movements are produced.

Figure 8B:
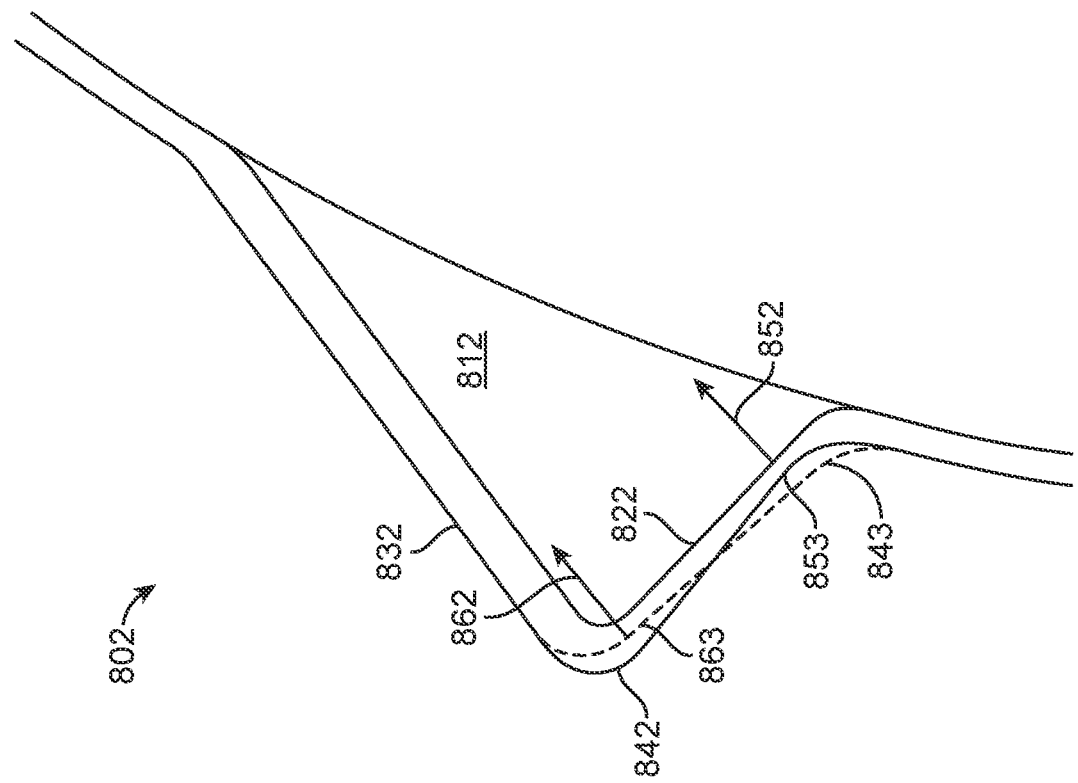
FIGS. 8A-8D illustrate the reduced sensitivity of attachments engaged on convex surfaces to manufacturing variations, compared to attachments engaged on planar surfaces, in accordance with many embodiments.
Figure 8A:
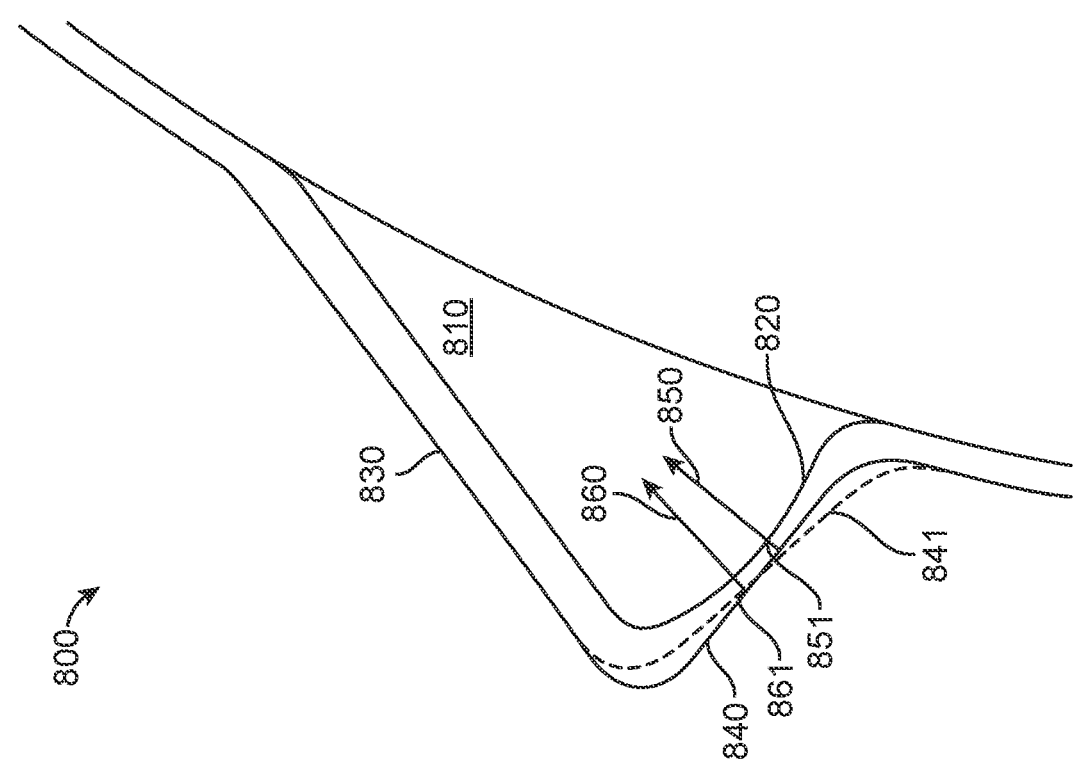

FIG. 8A illustrates the reduced sensitivity of attachments with convex surfaces to defects in appliance fabrication. An orthodontic system 800 is shown, comprising an attachment 810 with a convex surface 820 bonded to a tooth in order to allow the application of a tooth moving force when engaged by an engagement portion of an appliance 830. Orthodontic appliance 830 is illustrated with an engagement portion comprising a planar surface 840. Further illustrated is an alternate surface 841, which comprises a plane at a slightly different angle than surface 840. Due to manufacturing inaccuracies, an appliance intended to be fabricated with surface 840 might instead be fabricated with surface 841.

When surface 840 is brought into contact with attachment surface 820, it applies a force 850 at a contact location 851. By contrast, when surface 841 is brought into contact with attachment surface 820, it applies a different force 860 at a contact location 861. The difference in angles of the forces is approximately equal to the difference in angle of the planar surfaces 840 and 841. Similarly, the difference in force location is small, as can be seen by the small distance between contact locations 851 and 861. Thus, the difference in moment applied to tooth can be kept small, since the moment depends on the force and the contact location, neither of which has greatly changed.

In contrast to FIG. 8A, FIG. 8B illustrates the increased sensitivity of attachments with planar surfaces to defects in appliance fabrication. An orthodontic system 802 is shown, comprising an attachment 812 with a planar surface 822 bonded to a tooth in order to allow the application of a tooth moving force when engaged by an engagement portion an appliance 832. Orthodontic appliance 832 is illustrated with an engagement portion comprising a planar surface 842. Further illustrated is an alternate surface 843, which comprises a plane at a slightly different angle than surface 842. Due to manufacturing inaccuracies, an appliance intended to be fabricated with surface 842 might instead be fabricated with surface 843.

When surface 842 is brought into contact with attachment surface 822, it applies a force 852 at a contact location 853. By contrast, when surface 843 is brought into contact with attachment surface 822, it applies a different force 862 at a contact location 863. The difference in angles of the forces is not large, similar to the difference illustrated in FIG. 8A. However, the difference in force location is large, as can be seen by the large distance between contact locations 853 and 863. The difference in moment applied to tooth will be much larger than in corresponding FIG. 8A, since the moment depends on the force and the contact location, and the contact location has changed by a much larger amount: as illustrated, the distance between the two contact locations is nearly the full length of the planar surface 822. Thus, it can be appreciated that attachments with convex surfaces may be much less susceptible to appliance manufacturing errors than attachments with planar surfaces.

Figure 8D:
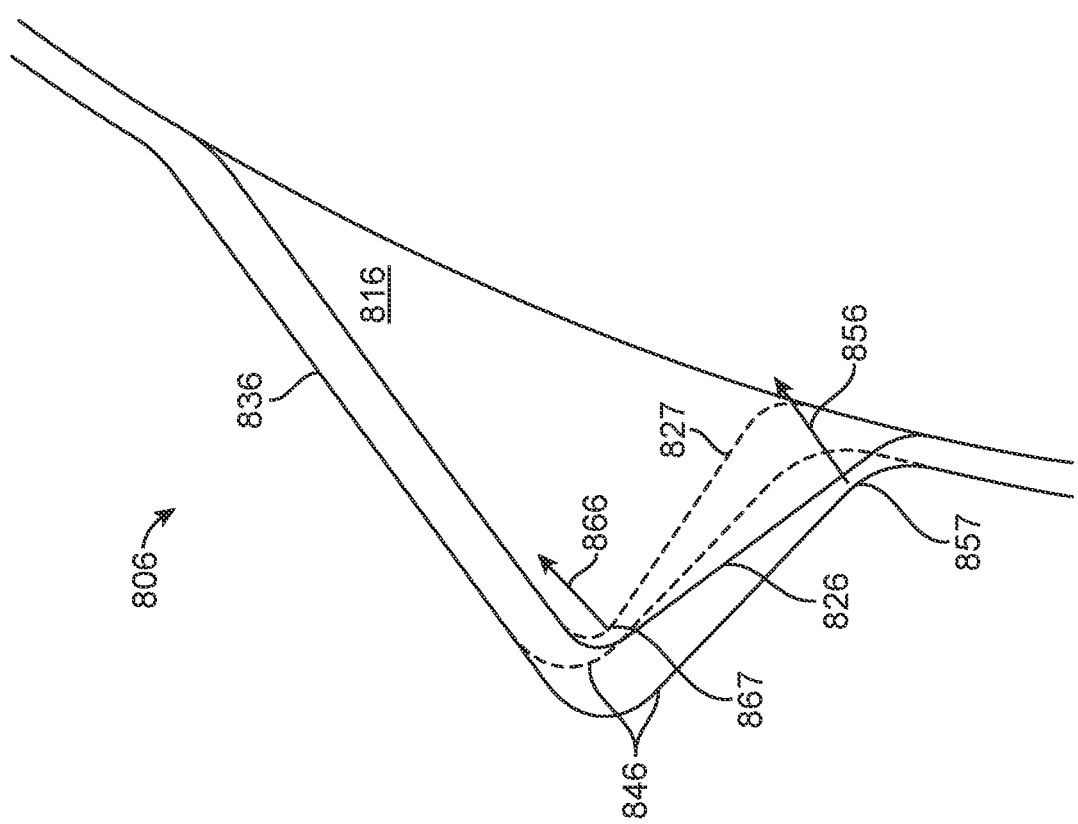
Figure 8C:
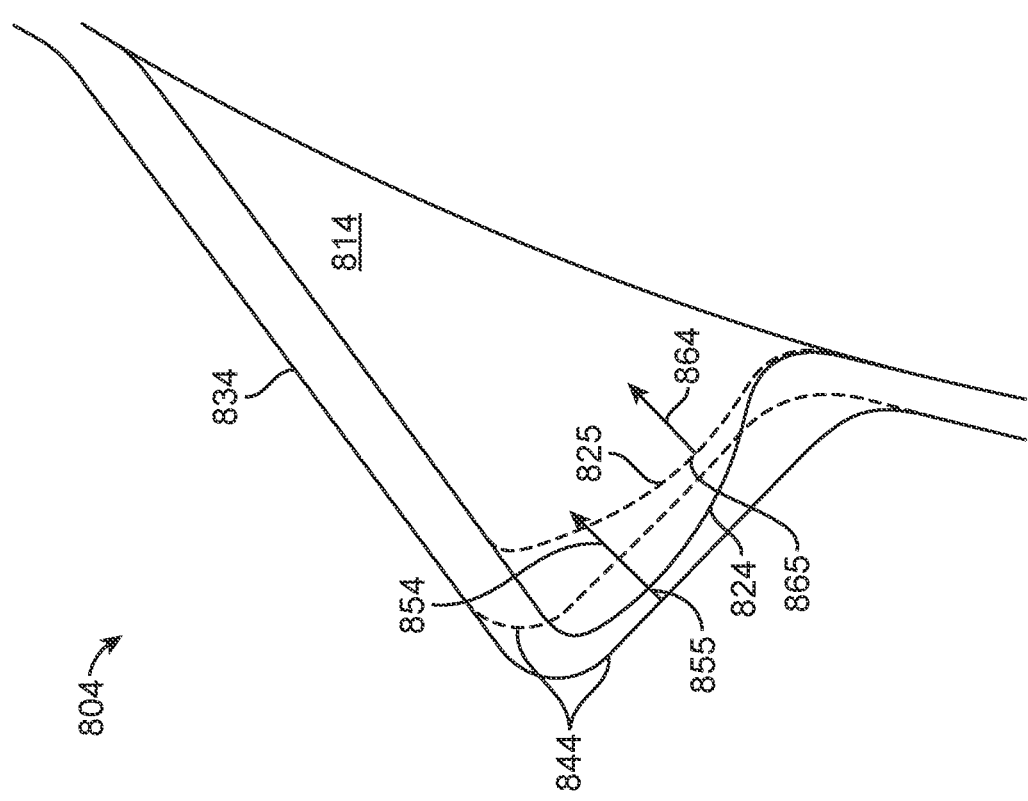

FIG. 8C illustrates the reduced sensitivity of attachments with convex surfaces to defects in attachment fabrication. An orthodontic system 804 is shown, comprising an attachment 814 with a convex surface 824 bonded to a tooth in order to allow the application of a tooth moving force when engaged by an engagement portion of an appliance 834. Orthodontic appliance 834 is illustrated with an engagement portion comprising a planar surface 844. Further illustrated is an alternate convex surface 825 of attachment 814, in which the left end of the convex surface 825 protrudes less than in convex surface 824. Due to manufacturing inaccuracies, an attachment intended to be fabricated with convex surface 824 might instead be fabricated with convex surface 825. The latter configuration of appliance and attachment is illustrated with dashed lines.

When appliance surface 844 is brought into contact with convex attachment surface 824, it applies a force 854 at a contact location 855. By contrast, when appliance surface 844 is brought into contact with attachment surface 825, it applies a different force 864 at a contact location 865. The appliance surface also translates to a different position in order to maintain contact. As can be seen in FIG. 8C, the contact location shifts a moderate amount between locations 855 and 865, due to the significant difference in shape of the convex surfaces 824 and 825, and the resulting movement of the appliance surface 844. However, despite this shift, the direction of forces 854 and 864 are substantially the same. This is because, in each case, the appliance surface is angled in the same direction, so that the force it applies—being substantially normal to the appliance surface so long as friction is low—points in substantially the same direction as well. Thus, an attachment with a convex surface can apply forces that are less sensitive to manufacturing defects of the convex surfaces.

In contrast to FIG. 8C, FIG. 8D illustrates the increased sensitivity of attachments with planar surfaces to defects in attachment fabrication. An orthodontic system 806 is shown, comprising an attachment 816 with a planar surface 826 bonded to a tooth in order to allow the application of a tooth moving force when engaged by an engagement portion of an appliance 836. Orthodontic appliance 836 is illustrated with an engagement portion comprising a planar surface 846. Further illustrated is an alternate planar surface 827 of attachment 816, in which the planar surface 827 is fabricated at a different angle than that of planar surface 826. Due to manufacturing inaccuracies, an attachment intended to be fabricated with planar surface 826 might instead be fabricated with planar surface 827. The latter configuration of appliance and attachment is illustrated with dashed lines.

When appliance surface 846 is brought into contact with planar attachment surface 826, it applies a force 856 at a contact location 857. By contrast, when appliance surface 846 is brought into contact with attachment surface 827, it applies a different force 866 at a contact location 867. The appliance surface also translates to a different position in order to maintain contact. As can be seen in FIG. 8D, the contact location shifts dramatically between locations 857 and 867, due to the difference in angle of planar surfaces 826 and 827, and the resulting movement of the appliance surface 846. Furthermore, the direction of forces 856 and 866 change as well. This can be seen from the fact that, although the appliance surface is angled in the same direction, the contact location shifts substantially, so that contact location 857 is beyond the end of planar surface 846, while contact location 867 is beyond the end of planar surface 827. Thus, in each case, the force applied may depend on the shape of the edges of the engagement portions of the appliance, rather than on the central, planar surface of the engagement portions as intended. This leads to an unpredictable force that varies strongly even with small imperfections in manufacturing. It can further be appreciated that, since both the force and the contact location change more in FIG. 8D than in corresponding FIG. 8C, the potential for variation in moment due to manufacturing defects is also greater for planar attachment surfaces than for convex surfaces.

The convex attachment devices described herein can be used in combination with a plurality of orthodontic appliances in order to produce complex tooth movement trajectories that involve sequential application of forces along different directions and/or at different locations. For example, the tooth movement trajectories may be non-linear trajectories, such as curved trajectories or trajectories with a variable tooth movement velocity (e.g., accelerating or decelerating movements). Some trajectories may comprise "round-tripping" motion, in which a tooth is moved in one direction away from an initial position and/or orientation, then later in an opposing direction at least partially towards to the initial position and/or orientation. Round-tripping may be beneficial, for example, to move an obstructing tooth away from the path of another tooth. In some cases, a tooth may be moved in a substantially straight line despite applying forces at different angles, because the applied forces act to oppose other forces incident on the tooth. In some cases, a portion of a trajectory may involve no motion of a tooth; for example, to allow other teeth to move in the meantime. Two or more sequential trajectories, whether complex or simple, may be combined to form an overall trajectory, which may be complex. Such combination may be repeated as desired to make an arbitrarily complex trajectory.

FIGS. 9A-9E illustrate how a tooth may be moved in a complex trajectory while applying forces to a single attachment comprising one or more convex surfaces, in accordance with embodiments.

Figure 9A:
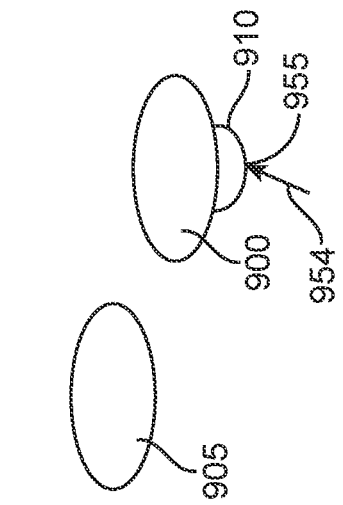
FIGS. 9A-9E illustrate how a tooth may be moved in a complex trajectory while applying forces to a single attachment comprising one or more convex engagement surfaces, in accordance with many embodiments.

FIG. 9A illustrates a tooth 900 bonded to an attachment 910 with a convex surface. In the depicted embodiment, the tooth 900 is desired to move to a target location 990 but cannot travel in a straight line because an obstructing tooth 905 is partially in the way. For this reason, a curved trajectory 980 is planned to move tooth 900 from its starting position to its target location 990. The first step is accomplished by fabricating an appliance with an engagement portion comprising a surface that engages the attachment's convex surface at a contact location 951 on the left side of the attachment, applying a force 950 pushing the tooth in a distal direction, toward the right of the image.

Figure 9B:
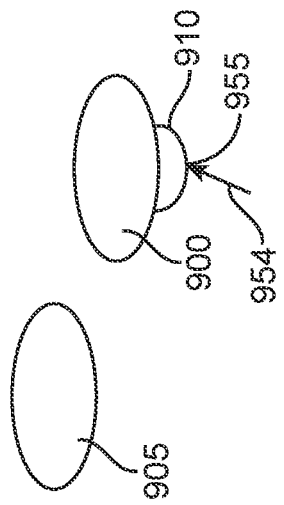

FIG. 9B shows the tooth 900 as it first begins moving. A first appliance contacts the attachment 910 at a contact location 953 chosen to produce a tooth moving force 952 that continues to push the tooth distally.

Figure 9C:
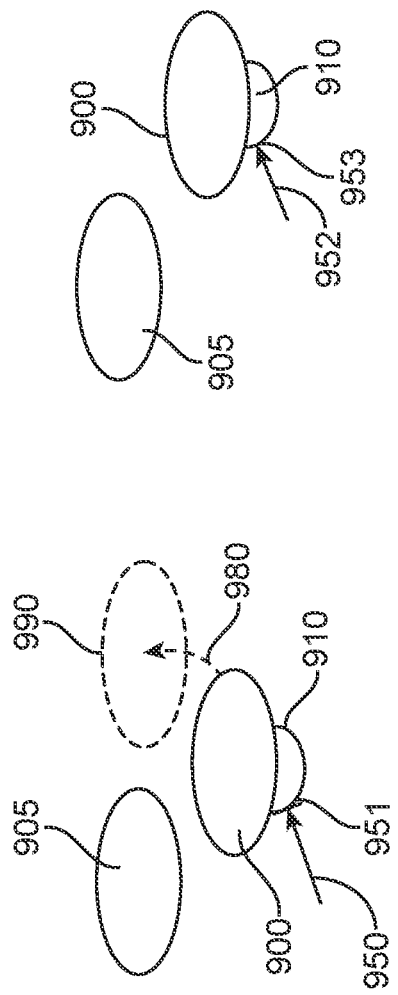

FIG. 9C illustrates the tooth 900 farther along its trajectory. Now that the tooth 900 is mostly clear of the obstructing tooth 905, the angle of force 954 is shifted by fabricating a second appliance to contact to contact the attachment 910 at a point 955 so as to apply a force pointed more toward the lingual direction at the top of the page.

Figure 9D:
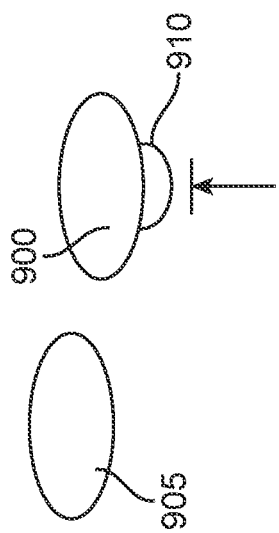

FIG. 9D illustrates the tooth 900 after fully clearing the obstructing tooth 905. The tooth 900 no longer needs to move distally, so a third appliance is fabricated with an engagement portion with a surface to contact the convex surface of attachment 910 at a point 957, thereby applying a force 956 in a lingual direction.

Figure 9E:
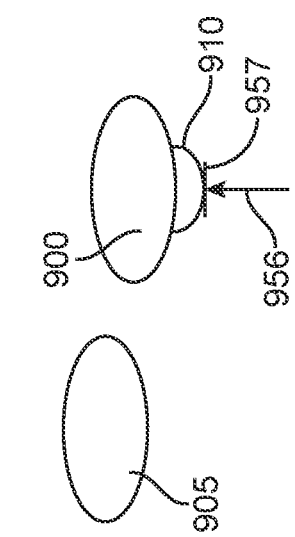

FIG. 9E shows the tooth 900 after arriving at its target location, in the desired alignment with tooth 905. At this point, orthodontic treatment may stop and attachment 910 may be removed. Alternately, if further movement of tooth 900 is desired (for example, extrusion, intrusion, translation, or rotation), then additional appliances may be fabricated with engagement portions comprising one or more surfaces configured to contact attachment 910 at the appropriate points to apply the required tooth moving forces.

FIGS. 10A-10E illustrate the use of an attachment comprising one or more convex surfaces to rotate a tooth in multiple directions to provide space to move a second tooth, thereby allowing a complex reorganization of teeth, in accordance with embodiments.

Figure 10C:
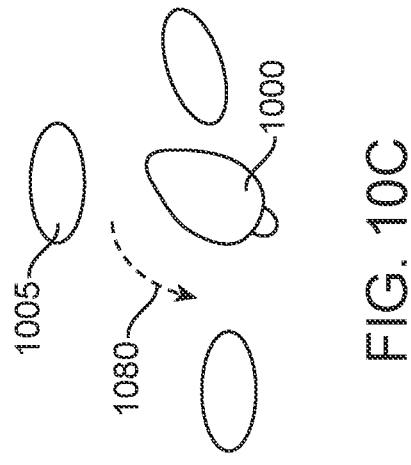
FIGS. 10A-10E illustrate the use of an attachment comprising one or more convex engagement surfaces to rotate a tooth in multiple directions to provide space to move a second tooth, thereby allowing a complex reorganization of teeth, in accordance with many embodiments.
Figure 10B:
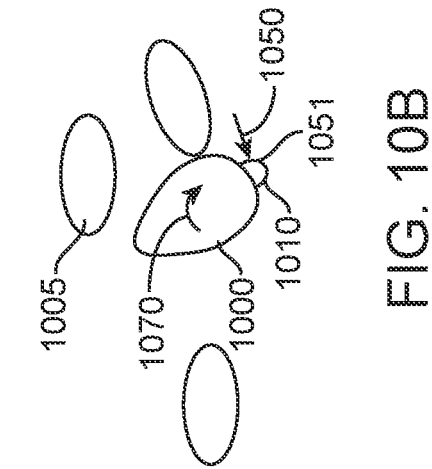
Figure 10A:
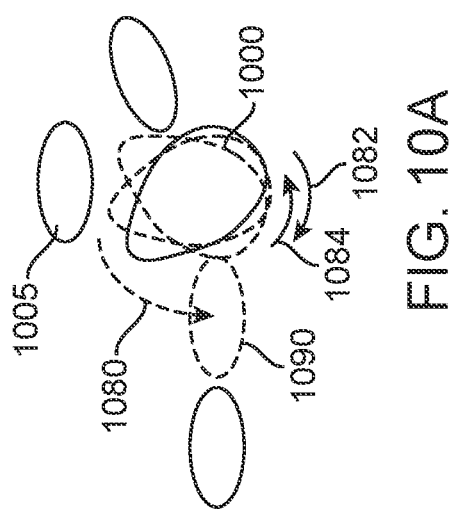

FIG. 10A illustrates a configuration of teeth in which a first tooth 1005 is desired to move to a target location 1090. In the depicted embodiment, a second tooth 1000 obstructs the straight line path. In order to rearrange the teeth to the desired configuration, the first tooth 1005 may be moved along a curved trajectory 1080, while the second tooth 1000 may be sequentially rotated: first with a clockwise rotation 1082, then with a counterclockwise rotation 1084 to return it to its original orientation.

FIG. 10B illustrates the starting position, in which a rotational movement is caused to the second tooth 1000 by applying a force 1050 to an attachment 1010 with a convex surface by engaging that surface with a first appliance at a contact location 1051. This produces a moment 1070 on the tooth 1000, causing a rotation of the tooth in a clockwise direction. Optionally, other forces (not shown) may also be applied to inhibit any translational movements elicited by the force 1050.

FIG. 10C illustrates a new tooth configuration in which the second tooth 1000 has been rotated to a position where it no longer obstructs the first tooth 1005. The first tooth 1005 is then moved along a trajectory 1080 to its target location. This movement may be accomplished using attachments with convex surfaces, as described in detail in FIGS. 9A-E, or by other methods; for example, using one or more conventional attachments, using appliances acting directly on tooth 1000, etc.

Figure 10E:
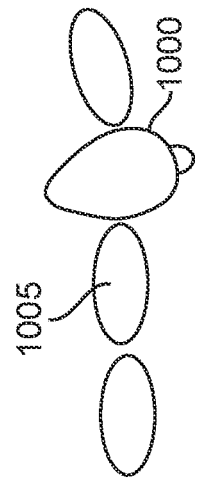
Figure 10D:
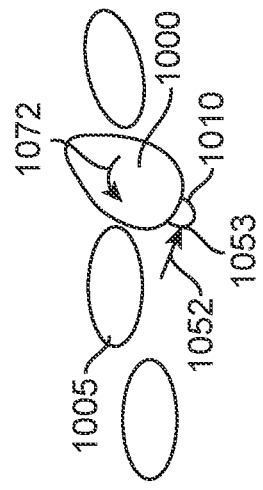

FIG. 10D illustrates the configuration of teeth 1000 and 1005 after the first tooth 1005 has arrived at its target location. The second tooth 1000 is now to be rotated to its original orientation, which requires a counterclockwise rotation. Accordingly, a second appliance is fabricated with an engagement portion with a surface configured to contact attachment 1010 at location 1053, thereby applying a force 1052 in the rightwards direction. This force produces a moment 1072 that causes a rotation of tooth 1000 in a counterclockwise direction. Optionally, other forces (not shown) may also be applied to inhibit any translational movements elicited by the force 1052.

FIG. 10E illustrates the final configuration of teeth 1000 and 1005 with each tooth in its desired location and orientation. At this point, orthodontic treatment may stop and attachment 1010 may be removed. Alternately, if further movement of tooth 1000 or tooth 1005 is desired (for example, extrusion, intrusion, translation, or rotation), then appliances may be fabricated with one or more engagement portions comprising one or more surfaces configured to contact attachment 1010 (or a corresponding attachment on tooth 1005) at the appropriate points to apply the required tooth moving forces.

Figure 11:
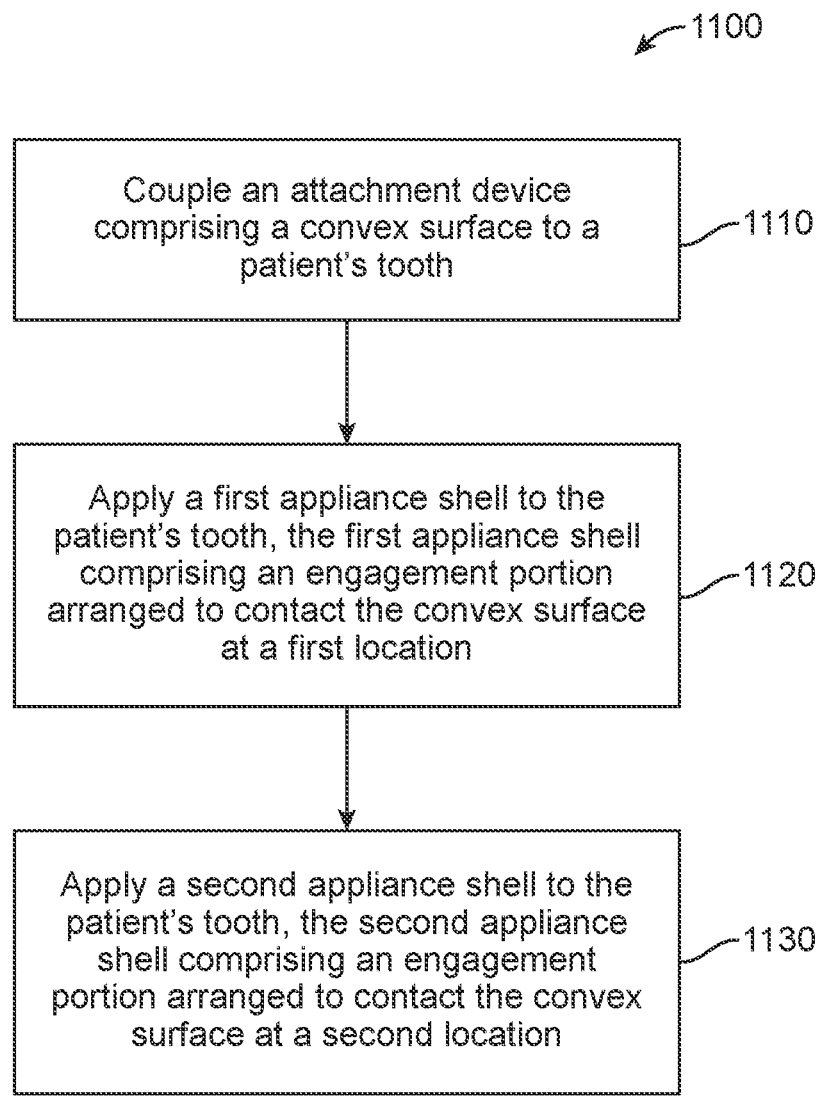
FIG. 11 illustrates a method of treating a patient using an attachment comprising a convex surface and one or more appliances, in accordance with many embodiments.

FIG. 11 illustrates a method 1100 of treating a patient using an attachment comprising a convex surface and one or more appliances, in accordance with embodiments. The method 1100, as with all other methods herein, can be used in combination with any embodiment of the attachment devices and appliances provided herein.

In step 1110, an attachment device comprising a convex surface is coupled to a patient's tooth. The attachment device may be mounted on the tooth by bonding the device to a surface of a tooth, using adhesive, for example. Alternatively, attachment may be molded and cured in situ, e.g., using a template appliance having an appropriately shaped recess to define the shape of the attachment. The position, orientation, and surface geometry of the attachment device may be chosen so as to allow the application of desired tooth moving forces by one or more appliances.

In step 1120, an appliance is supplied to the patient for placement in the patient's mouth. The shell of the appliance comprises an engagement portion arranged to contact the convex surface at a first location, thereby applying a tooth moving force at that location, and in a direction that is substantially normal to the surface of the attachment at the first location. This tooth moving force may cause a movement of the tooth along a desired trajectory. In some cases, the desired trajectory may be that the tooth be prevented from moving, in which case the tooth moving force may be applied to counteract an otherwise expected movement. Additionally or alternatively, the tooth moving force may be applied to reduce, prevent, or reverse a movement in a particular direction, while allowing or causing movement in another direction.

In step 1130, a second appliance is supplied to the patient for placement in the patient's mouth. The shell of the appliance comprises an engagement portion arranged to contact the convex surface at a first location, thereby applying a tooth moving force at that location, and in a direction that is substantially normal to the surface of the attachment at the first location. This tooth moving force may cause a movement of the tooth along a desired trajectory. In some cases, the desired trajectory may be that the tooth be prevented from moving, in which case the tooth moving force may be applied to counteract an otherwise expected movement. Additionally or alternatively, the tooth moving force may be applied to reduce, prevent, or reverse a movement in a particular direction, while allowing or causing movement in another direction.

Step 1130 is optional and may be omitted. For example, step 1130 may be unnecessary if step 1120 was sufficient to arrange the patient's teeth as desired. Step 1130 may also be unnecessary if orthodontic correction after step 1120 is to be performed without orthodontic appliances or without use of the convex-surfaced attachment. Alternatively, step 1130 may be repeated as many times as needed, applying to the patient's tooth a third appliance, fourth appliance, fifth appliance, and so on to accomplish long and/or complex movements of teeth.

Figure 12:
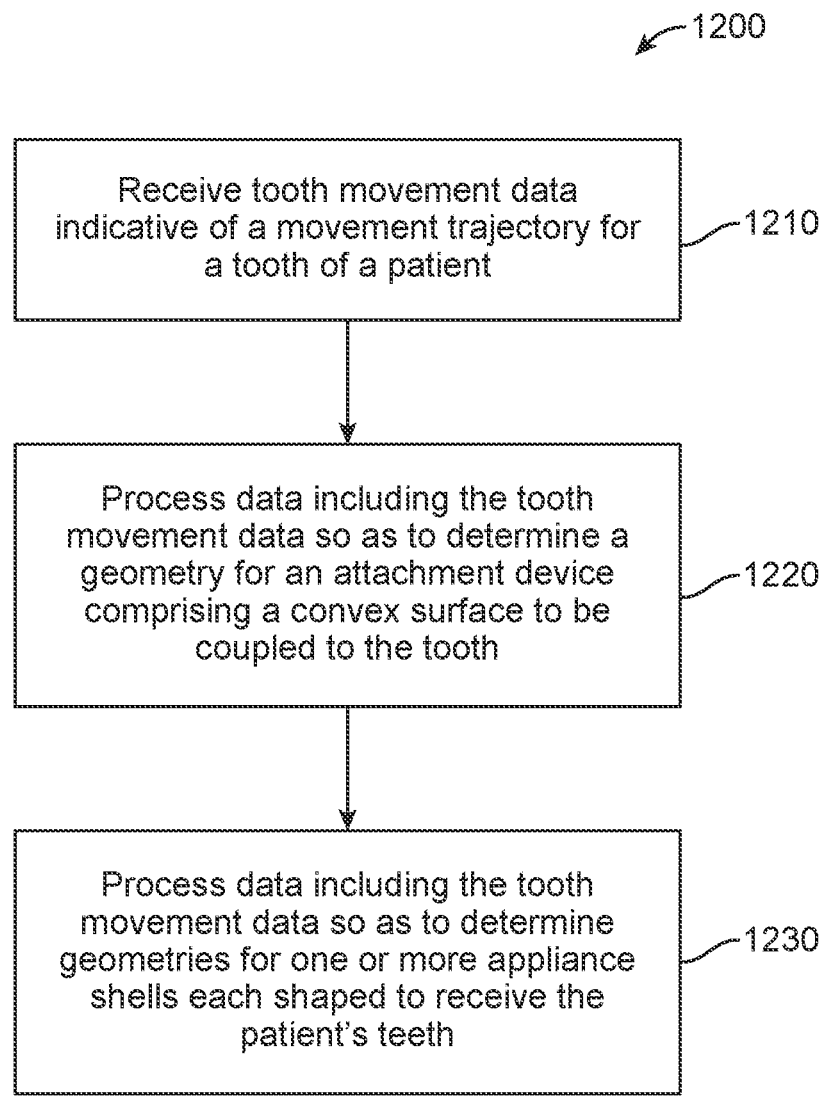
FIG. 12 illustrates a method of designing appliances and attachments to treat a patient, in accordance with many embodiments.

FIG. 12 illustrates a method 1200 of designing appliances and attachments to treat a patient, in accordance with embodiments. Method 1200 may be performed by a data processing system, as disclosed herein.

In step 1210, tooth movement data are received indicative of a movement trajectory for a tooth of a patient. The tooth movement data may comprise a starting position and target position of one or more teeth, as well as trajectories over which the one or more teeth are desired to be moved. The positions of further teeth not desired to be moved may also be specified. The indicated movement trajectories may comprise an ordered sequence of movements, and different teeth may be moved concurrently or sequentially as part of the overall movement trajectory of the teeth. In some embodiments, the movement paths are configured to move the teeth in the quickest fashion with the least amount of round-tripping to bring the teeth from their initial positions to their desired target positions. Alternatively, some round tripping may be used; for example, to allow other aspects of the movement paths to be easier to perform. The tooth paths can optionally be segmented, and the segments can be calculated so that each tooth's motion within a segment stays within threshold limits of linear and rotational translation. In this way, the end points of each path segment can constitute a clinically viable repositioning, and the aggregate of segment end points can constitute a clinically viable sequence of tooth positions, so that moving from one point to the next in the sequence does not result in a collision of teeth.

In step 1220, the system processes data including the tooth movement data so as to determine a geometry for an attachment device comprising a convex surface to be coupled to the tooth. To determine the geometry of the attachment device, a force system to produce movement of the one or more teeth along the movement path may be determined. A force system can include one or more forces and/or one or more moments. Different force systems can result in different types of tooth movement, such as tipping, translation, rotation, extrusion, intrusion, root movement, etc. Biomechanical principles, modeling techniques, force calculation/measurement techniques, and the like, including knowledge and approaches commonly used in orthodontia, may be used to determine the appropriate force system to be applied to the tooth to accomplish the tooth movement. In determining the force system to be applied, sources may be considered including literature, force systems determined by experimentation or virtual modeling, computer-based modeling, clinical experience, minimization of unwanted forces, etc.

Based on the set of forces and/or moments identified to cause the tooth movement, an attachment geometry may be determined. The attachment geometry may include an attachment surface shape as well as an attachment position and orientation of the surface of a tooth. In some cases, a plurality of attachments may be chosen for attachment to one or more teeth. The attachment surface shape may be chosen to allow forces to be applied by one or more appliance surfaces contacting the attachment at one or more respective locations. For example, an attachment may be designed with one or more convex surfaces, wherein for each force and/or moment to be applied to the attachment, that force and/or moment may be applied by contacting an appliance surface to the attachment at one or more locations on one or more of its convex surfaces. In some cases, the choice of attachment surface shape may be made by choosing from a set of pre-designed surfaces, such as spherical, ellipsoidal, or cylindrical surface portions. In further cases, the attachment surface shape may be custom designed based on the set of forces and/or moments desired; for example, a convex surface may be designed by identifying a solid angle large enough to include all desired forces, then choosing a convex surface large enough to include at least the identified solid angle.

In step 1230, the system processes data including the tooth movement data so as to determine geometries for one or more appliance shells shaped to fit the patient's teeth. The appliance shells may comprise engagement portions with surfaces configured to engage one or more convex surfaces of the attachments identified in step 1220 at locations chosen to apply the desired forces and/or moments needed to cause the tooth movements along the trajectory identified in step 1210. In some cases, an appliance may comprise a plurality of surfaces to engage one or more convex surfaces of an attachment, so as to produce combined or differential forces and/or moments. In cases involving a plurality of appliance shells, each shell may have independently configured engagement portions with respective independently configured surfaces, allowing each shell to apply an independently chosen force and/or moment by engaging one or more convex attachment surfaces at independently determined locations. By applying these appliances sequentially to the patient's teeth, a sequence of tooth movements may be caused, the net effect of which is to move one or more teeth along controlled trajectories over time. Each appliance may be designed to properly receive the patient's teeth in the positions they are expected to be in at the time the appliance is to be worn, and these designs may be updated over time, for example, if further measurements of the patient's teeth indicate that one or more teeth are not moving as predicted.

Figure 13:
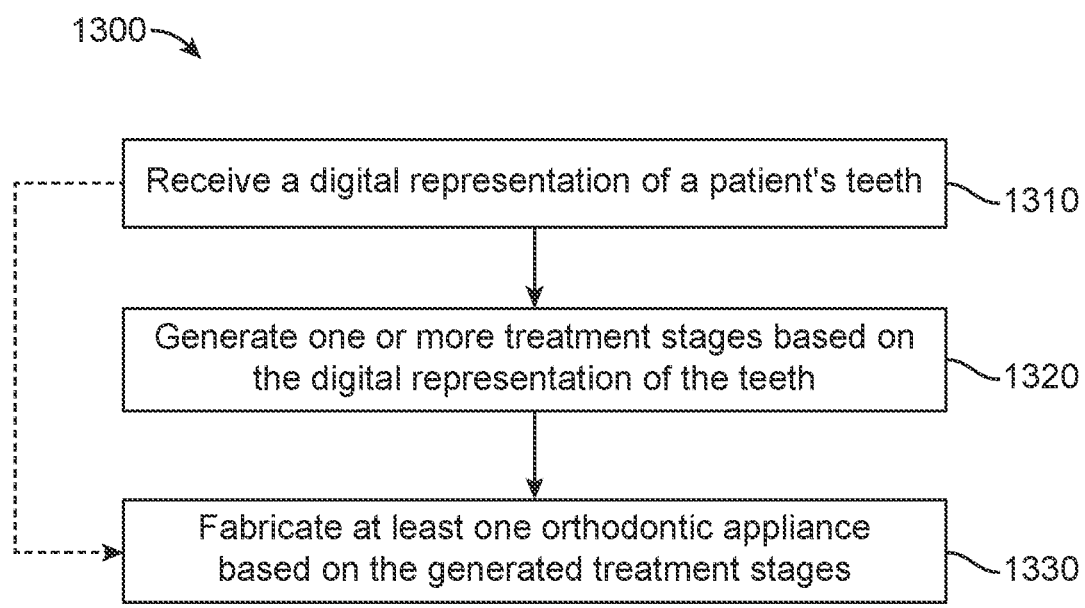
FIG. 13 illustrates a method for digitally planning an orthodontic treatment, in accordance with many embodiments.

FIG. 13 illustrates a method for digitally planning an orthodontic treatment, in accordance with embodiments. The method 1300 can be applied to any of the treatment procedures described herein and can be performed by any suitable data processing system. Any embodiment of the appliances or attachments described herein can be designed or fabricated using the method 1300.

In step 1310, a digital representation of a patient's teeth is received. The digital representation can include surface topography data for the patient's intraoral cavity (including teeth, gingival tissues, etc.). The surface topography data can be generated by directly scanning the intraoral cavity, a physical model (positive or negative) of the intraoral cavity, or an impression of the intraoral cavity, using a suitable scanning device (e.g., a handheld scanner, desktop scanner, etc.).

In step 1320, one or more treatment stages are generated based on the digital representation of the teeth. The treatment stages can be incremental repositioning stages of an orthodontic treatment procedure designed to move one or more of the patient's teeth from an initial tooth arrangement to a target arrangement. For example, the treatment stages can be generated by determining the initial tooth arrangement indicated by the digital representation, determining a target tooth arrangement, and determining movement paths of one or more teeth in the initial arrangement necessary to achieve the target tooth arrangement. The movement path can be optimized based on minimizing the total distance moved, preventing collisions between teeth, avoiding tooth movements that are more difficult to achieve, or any other suitable criteria.

In step 1330, at least one orthodontic appliance is fabricated based on the generated treatment stages. For example, a set of appliances can be fabricated to be sequentially worn by the patient to incrementally reposition the teeth from the initial arrangement to the target arrangement. Some of the appliances can be shaped to accommodate a tooth arrangement specified by one of the treatment stages. Alternatively or in combination, some of the appliances can be shaped to accommodate a tooth arrangement that is different from the target arrangement for the corresponding treatment stage. For example, as previously described herein, an appliance may have a geometry comprising an engagement portion with a surface to engage a particular location of a convex surface of an attachment bonded to a patient's tooth, so as to apply a desired force and/or moment to the tooth. Such an appliance may be used to ensure that a suitable amount of force is expressed on the teeth as they approach or attain their desired target positions for the treatment stage. As another example, an appliance can be designed in order to apply a specified force system on the teeth and may not have a geometry corresponding to any current or planned arrangement of the patient's teeth.

In some instances, staging of various arrangements or treatment stages may not be necessary for design and/or fabrication of an appliance. As illustrated by the dashed line in FIG. 13, design and/or fabrication of an orthodontic appliance, and perhaps a particular orthodontic treatment, may include use of a representation of the patient's teeth (e.g., receive a digital representation of the patient's teeth 1310), followed by design and/or fabrication of an orthodontic appliance based on a representation of the patient's teeth in the arrangement represented by the received representation.

Figure 14:
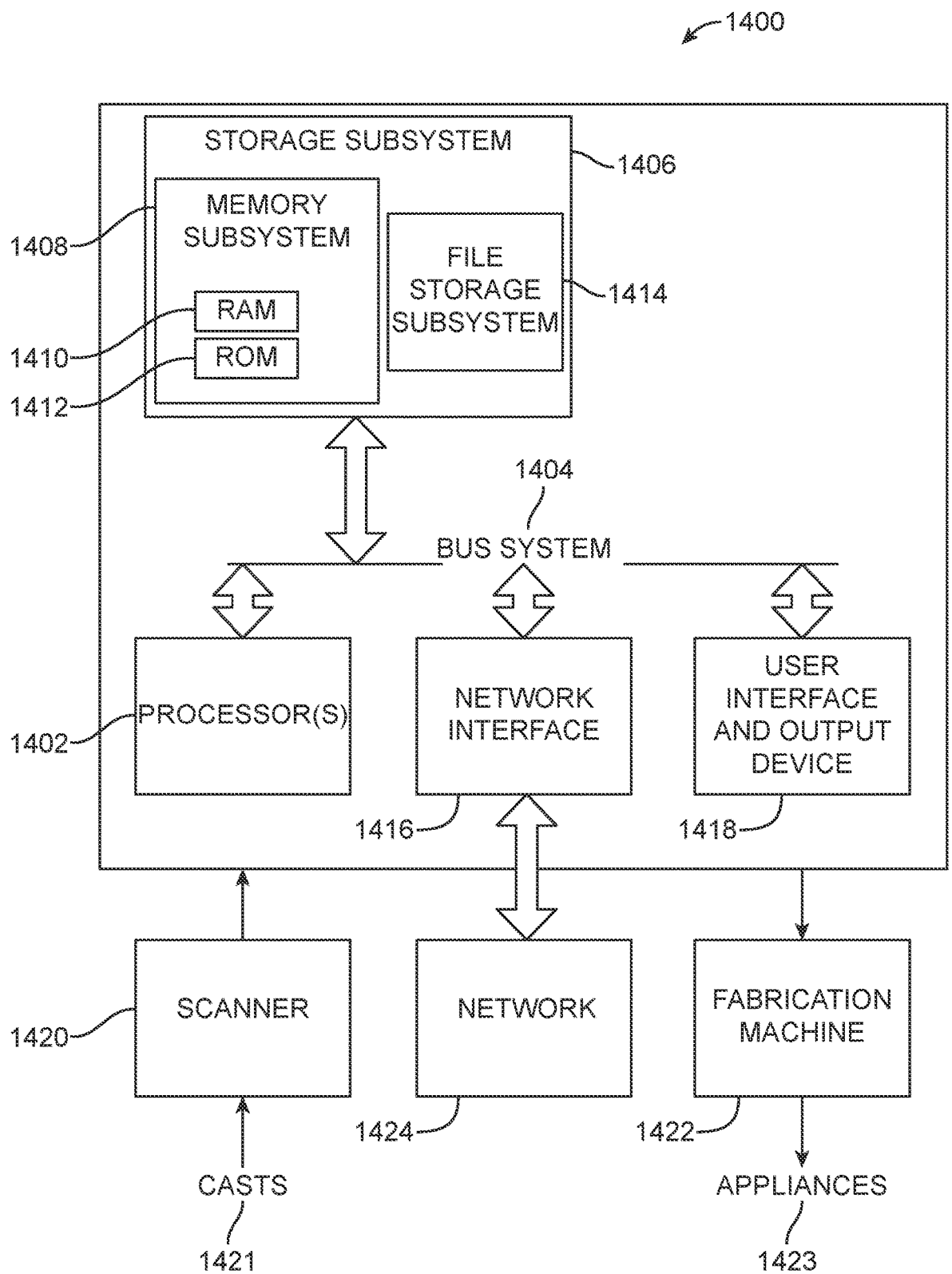
FIG. 14 is a simplified block diagram of a data processing system, in accordance with many embodiments.

FIG. 14 is a simplified block diagram of a data processing system 1400 that may be used in executing methods and processes described herein. The data processing system 1400 typically includes at least one processor 1402 that communicates with one or more peripheral devices via bus subsystem 1404. These peripheral devices typically include a storage subsystem 1406 (memory subsystem 1408 and file storage subsystem 1414), a set of user interface input and output devices 1418, and an interface to outside networks 1416. This interface is shown schematically as "Network Interface" block 1416 and is coupled to corresponding interface devices in other data processing systems via communication network interface 1424. Data processing system 1400 can include, for example, one or more computers, such as a personal computer, workstation, mainframe, laptop, and the like.

The user interface input devices 1418 are not limited to any particular device, and can typically include, for example, a keyboard, pointing device, mouse, scanner, interactive displays, touchpad, joysticks, etc. Similarly, various user interface output devices can be employed in a system of the invention, and can include, for example, one or more of a printer, display (e.g., visual, non-visual) system/subsystem, controller, projection device, audio output, and the like.

Storage subsystem 1406 maintains the basic required programming, including computer readable media having instructions (e.g., operating instructions, etc.), and data constructs. The program modules discussed herein are typically stored in storage subsystem 1406. Storage subsystem 1406 typically includes memory subsystem 1408 and file storage subsystem 1414. Memory subsystem 1408 typically includes a number of memories (e.g., RAM 1410, ROM 1412, etc.) including computer readable memory for storage of fixed instructions, instructions and data during program execution, basic input/output system, etc. File storage subsystem 1414 provides persistent (non-volatile) storage for program and data files, and can include one or more removable or fixed drives or media, hard disk, floppy disk, CD-ROM, DVD, optical drives, and the like. One or more of the storage systems, drives, etc. may be located at a remote location, such coupled via a server on a network or via the internet/World Wide Web. In this context, the term "bus subsystem" is used generically so as to include any mechanism for letting the various components and subsystems communicate with each other as intended and can include a variety of suitable components/systems that would be known or recognized as suitable for use therein. It will be recognized that various components of the system can be, but need not necessarily be at the same physical location, but could be connected via various local-area or wide-area network media, transmission systems, etc.

Scanner 1420 includes any means for obtaining a digital representation (e.g., images, surface topography data, etc.) of a patient's teeth (e.g., by scanning physical models of the teeth such as casts 1421, by scanning impressions taken of the teeth, or by directly scanning the intraoral cavity), which can be obtained either from the patient or from treating professional, such as an orthodontist, and includes means of providing the digital representation to data processing system 1400 for further processing. Scanner 1420 may be located at a location remote with respect to other components of the system and can communicate image data and/or information to data processing system 1400, for example, via a network interface 1424. Fabrication system 1422 fabricates appliances 1423 based on a treatment plan, including data set information received from data processing system 1400. Fabrication machine 1422 can, for example, be located at a remote location and receive data set information from data processing system 1400 via network interface 1424.

While preferred embodiments of the present disclosure have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the invention and that methods and structures within the scope of these claims and their equivalents be covered thereby.

What is claimed is:

1. An orthodontic system for repositioning a patient's teeth, the system comprising:
   an attachment configured to be coupled to a tooth of the patient, wherein the attachment comprises a first contacting region and a second contacting region that are different from each other;
   a first orthodontic appliance comprising a first plurality of tooth receiving cavities shaped to receive the patient's teeth, wherein the first plurality of tooth receiving cavities are configured to contact and bias against the first contacting region of the attachment and generate a first tooth-moving force comprising a first vector;
   a second orthodontic appliance comprising a second plurality of tooth receiving cavities shaped to receive the patient's teeth, wherein the second plurality of tooth receiving cavities are configured to contact and bias against the second contacting region of the attachment and generate a second tooth-moving force comprising a second vector; and
   wherein the first vector and the second vector are different.

2. The orthodontic system of claim 1, wherein the first orthodontic appliance and the second orthodontic appliance correspond to different stages of an orthodontic treatment plan.

3. The orthodontic system of claim 1, wherein the first vector and the second vector facilitate incremental movement of the tooth of the patient in accordance with an orthodontic treatment plan.

4. The orthodontic system of claim 1, wherein the attachment comprises a convex surface.

5. The orthodontic system of claim 4, wherein the convex surface comprises a spherical, ellipsoidal, or cylindrical surface profile.

6. The orthodontic system of claim 1, wherein the first orthodontic appliance and the second orthodontic appliance facilitate movement of the tooth of the patient along a movement path.

7. The orthodontic system of claim 6, wherein the movement path comprises a non-linear movement trajectory.

8. The orthodontic system of claim 6, wherein the movement path is configured to produce round-tripping of the tooth.

9. The orthodontic system of claim 1, wherein the attachment further comprises a first non-contacting surface that does not engage with the first orthodontic appliance and a second non-contacting surface that does not engage with the second orthodontic appliance.

10. The orthodontic system of claim 1, wherein the first orthodontic appliance is configured to apply a first tooth repositioning force in a direction substantially normal to a point of contact with the attachment.

11. The orthodontic system of claim 1, wherein the attachment comprises a radius of curvature of about 0.5 mm to about 10 mm.

12. The orthodontic system of claim 1, wherein the attachment comprises a radius of curvature of about 150 mm to about 200 mm.

13. The orthodontic system of claim 1, wherein the attachment comprises a curvilinear profile.

14. The orthodontic system of claim 1, wherein the second orthodontic appliance comprises a geometry to allow for overcorrection of the tooth of the patient towards a target position.

15. The orthodontic system of claim 1, wherein the attachment is coupled to the tooth of the patient with a light-curable adhesive.

16. The orthodontic system of claim 1, wherein the first orthodontic appliance and the second orthodontic appliance are part of a plurality of orthodontic aligners in an orthodontic treatment plan; and wherein each of the plurality of orthodontic aligners are fabricated prior to the patient beginning the orthodontic treatment plan.

17. The orthodontic system of claim 1, wherein the first orthodontic appliance and the second orthodontic appliance are directly fabricated via 3D printing techniques.

18. The orthodontic system of claim 1, wherein the first plurality of tooth receiving cavities does not bias against the second contacting region and the second plurality of tooth receiving cavities does not bias against the first contacting region.

\* \* \* \* \*